(12) United States Patent
Miyazaki et al.

(10) Patent No.: US 8,291,113 B2
(45) Date of Patent: Oct. 16, 2012

(54) COMMUNICATION TRANSMITTING APPARATUS AND COMMUNICATION TRANSMITTING METHOD

(75) Inventors: Keiji Miyazaki, Kawasaki (JP); Akira Nagata, Fukuoka (JP); Shinya Kano, Kawasaki (JP); Yasuki Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 12/285,240

(22) Filed: Sep. 30, 2008

(65) Prior Publication Data

US 2009/0182801 A1    Jul. 16, 2009

(30) Foreign Application Priority Data

Jan. 16, 2008    (JP) ................. 2008-007168

(51) Int. Cl.
G06F 15/16    (2006.01)
(52) U.S. Cl. .................................................. 709/242
(58) Field of Classification Search .............. 709/242
See application file for complete search history.

(56) References Cited

U.S. PATENT DOCUMENTS

| | | | | |
|---|---|---|---|---|
| 8,068,409 B2 * | 11/2011 | Kumaresan et al. | .......... | 370/216 |
| 2002/0069259 A1 * | 6/2002 | Kushwaha et al. | .......... | 709/217 |
| 2004/0076151 A1 * | 4/2004 | Fant et al. | .......... | 370/389 |

FOREIGN PATENT DOCUMENTS

| | | |
|---|---|---|
| JP | 2004-304547 | 10/2004 |
| JP | 2004-320390 | 11/2004 |

OTHER PUBLICATIONS

Shami, A.; Assi, C.; Habib, I.; Ali, M.A., "Performance evaluation of two GMPLS-based distributed control and management protocols for dynamic lightpath provisioning in future IP networks," Communications, 2002. ICC 2002. IEEE International Conference on , vol. 4, no., vol. 4, 2002.*

Banerjee, A.; Drake, J.; Lang, J.P.; Turner, B.; Kompella, K.; Rekhter, Y., "Generalized multiprotocol label switching: an overview of routing and management enhancements," Communications Magazine, IEEE , vol. 39, No. 1, Jan. 2001.*

J. Lang, Ed., Sonos, Inc., Link Management Protocol (LMP); RFC4204, Oct. 2005 (pp. 1-64).

Japanese Office Action mailed May 22, 2012 for corresponding Japanese Application No. 2008-007168, with English-language translation.

* cited by examiner

Primary Examiner — Ryan Jakovac
(74) Attorney, Agent, or Firm — Fujitsu Patent Center

(57) ABSTRACT

When opposed communication transmitting apparatuses A and C are connected in a physical configuration thorough a communication transmitting apparatus B, if an interface configuration changing command is input to the communication transmitting apparatus B, the interface configuration is changed in the communication transmitting apparatus B and virtual connection is achieved such that the opposed communication transmitting apparatuses A and C pass through the communication transmitting apparatus B to directly connect an interface A1 and an interface C1. In this situation, since the GMPLS operation target apparatuses are only the communication transmitting apparatus A and the communication transmitting apparatus C and the communication transmitting apparatus B is a non-target apparatus of the GMPLS operation, the GMPLS scalability problem is solved and optical signals may be transferred at higher speed.

16 Claims, 32 Drawing Sheets

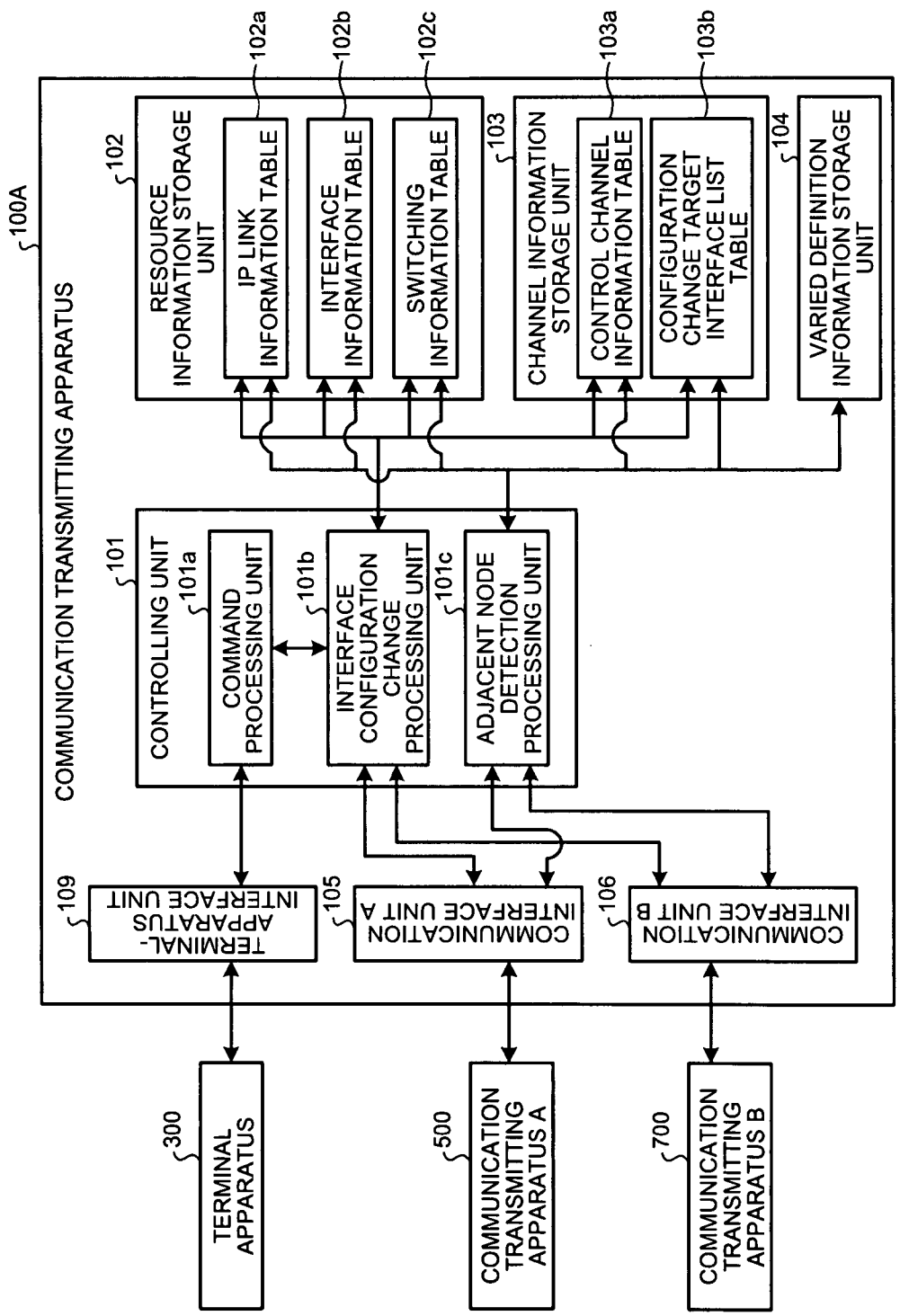

FIG.3A

| IDENTIFIER | IP ADDRESS | CONTROL CHANNEL USAGE INFORMATION |
|---|---|---|
| 1 | IP2 | USE |
| 2 | IP2 | USE |

FIG.3B

| IDENTIFIER | COUNTERPART COMMUNICATION TRANSMITTING APPARATUS ID | COUNTERPART COMMUNICATION TRANSMITTING APPARATUS INTERFACE ID | GMPLS CONTROL |
|---|---|---|---|
| IF101 | N1 | IF501 | EXECUTE |
| IF102 | N3 | IF701 | EXECUTE |

FIG.3C

| COMMUNICATION TRANSMITTING APPARATUS A | | | COMMUNICATION TRANSMITTING APPARATUS B | | |
|---|---|---|---|---|---|
| INTERFACE ID | RESOURCE | UNIT OF SWITCHING | INTERFACE ID | RESOURCE | UNIT OF SWITCHING |
| IF101 | 1CH-48CH | 48CH | IF102 | 1CH-48CH | 48CH |

FIG.4A

| IDENTIFIER | IP LINK | COUNTERPART COMMUNICATION TRANSMITTING APPARATUS IP ADDRESS | COUNTERPART COMMUNICATION TRANSMITTING APPARATUS ID |
|---|---|---|---|
| 1 | 1 | IP1 | N1 |
| 2 | 2 | IP3 | N3 |

FIG.4B

| INTERFACE ID | COUNTERPART COMMUNICATION TRANSMITTING APPARATUS IP ADDRESS | COUNTERPART COMMUNICATION TRANSMITTING APPARATUS ID | COUNTERPART COMMUNICATION TRANSMITTING APPARATUS INTERFACE ID | DIRECT-LINK TARGET INTERFACE ID |
|---|---|---|---|---|
| IF101 | IP1 | N1 | IF501 | IF102 |
| IF102 | IP3 | N3 | IF701 | IF101 |

FIG.5

| | |
|---|---|
| (1) | DESTINATION IP ADDRESS |
| (2) | SOURCE IP ADDRESS |
| (3) | SOURCE APPARATUS ID |
| (4) | CHANGED IP ADDRESS |
| (5) | CHANGED APPARATUS ID |
| (6) | CHANGE TARGET COMMUNICATION TRANSMITTING APPARATUS ID |
| (7) | CHANGE TARGET COMMUNICATION TRANSMITTING APPARATUS INTERFACE ID |
| (8) | CHANGED COMMUNICATION TRANSMITTING APPARATUS ID |
| (9) | CHANGED COMMUNICATION TRANSMITTING APPARATUS INTERFACE ID |

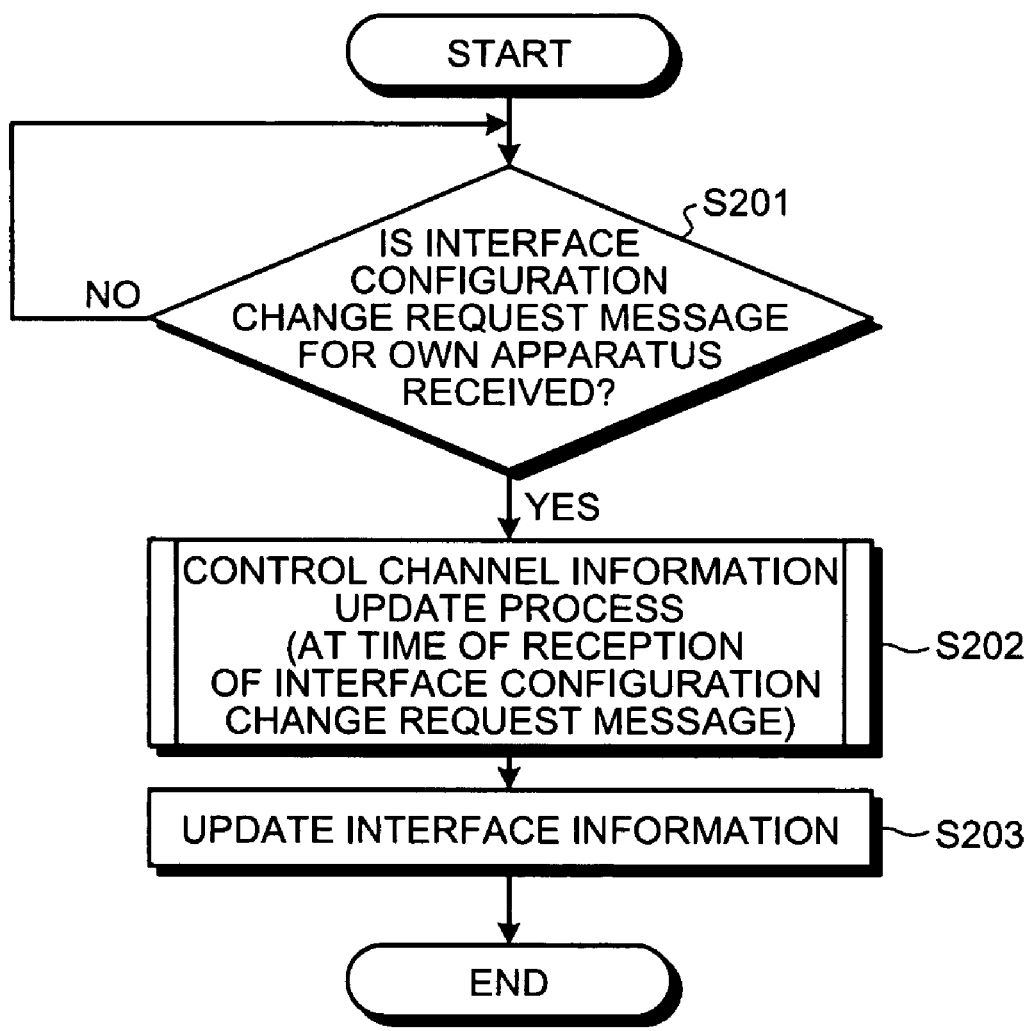

FIG.11A

| IDENTIFIER | COUNTERPART COMMUNICATION TRANSMITTING APPARATUS ID | COUNTERPART COMMUNICATION TRANSMITTING APPARATUS INTERFACE ID | GMPLS CONTROL |
|---|---|---|---|
| IF101 | N1 | IF501 | EXECUTE |
| IF103 | N1 | IF502 | EXECUTE |
| IF102 | N3 | IF701 | EXECUTE |
| IF104 | N3 | IF702 | EXECUTE |

FIG.11B

| COMMUNICATION TRANSMITTING APPARATUS A | | | COMMUNICATION TRANSMITTING APPARATUS B | | |
|---|---|---|---|---|---|
| INTERFACE ID | RESOURCE | UNIT OF SWITCHING | INTERFACE ID | RESOURCE | UNIT OF SWITCHING |
| IF101 | 1CH-48CH | 48CH | IF102 | 1CH-48CH | 48CH |
| IF103 | 1CH-48CH | 48CH | IF104 | 1CH-48CH | 48CH |

FIG.12

| INTERFACE ID | COUNTERPART COMMUNICATION TRANSMITTING APPARATUS IP ADDRESS | COUNTERPART COMMUNICATION TRANSMITTING APPARATUS ID | COUNTERPART COMMUNICATION TRANSMITTING APPARATUS INTERFACE ID | DIRECT-LINK TARGET INTERFACE ID |
|---|---|---|---|---|
| IF101 | IP1 | N1 | IF501 | IF102 |
| IF103 | IP1 | N1 | IF502 | IF104 |
| IF102 | IP3 | N3 | IF701 | IF101 |
| IF104 | IP3 | N3 | IF702 | IF103 |

FIG.13

| (1) | DESTINATION IP ADDRESS |
|---|---|
| (2) | SOURCE IP ADDRESS |
| (3) | SOURCE APPARATUS ID |
| (4) | CHANGED IP ADDRESS |
| (5) | CHANGED APPARATUS ID |
| (6) | FIRST CHANGE TARGET COMMUNICATION TRANSMITTING APPARATUS ID |
| (7) | FIRST CHANGE TARGET COMMUNICATION TRANSMITTING APPARATUS INTERFACE ID |
| (8) | SECOND CHANGE TARGET COMMUNICATION TRANSMITTING APPARATUS ID |
| (9) | SECOND CHANGE TARGET COMMUNICATION TRANSMITTING APPARATUS INTERFACE ID |
| (10) | FIRST CHANGED COMMUNICATION TRANSMITTING APPARATUS ID |
| (11) | FIRST CHANGED COMMUNICATION TRANSMITTING APPARATUS INTERFACE ID |
| (12) | SECOND CHANGED COMMUNICATION TRANSMITTING APPARATUS ID |
| (13) | SECOND CHANGED COMMUNICATION TRANSMITTING APPARATUS INTERFACE ID |

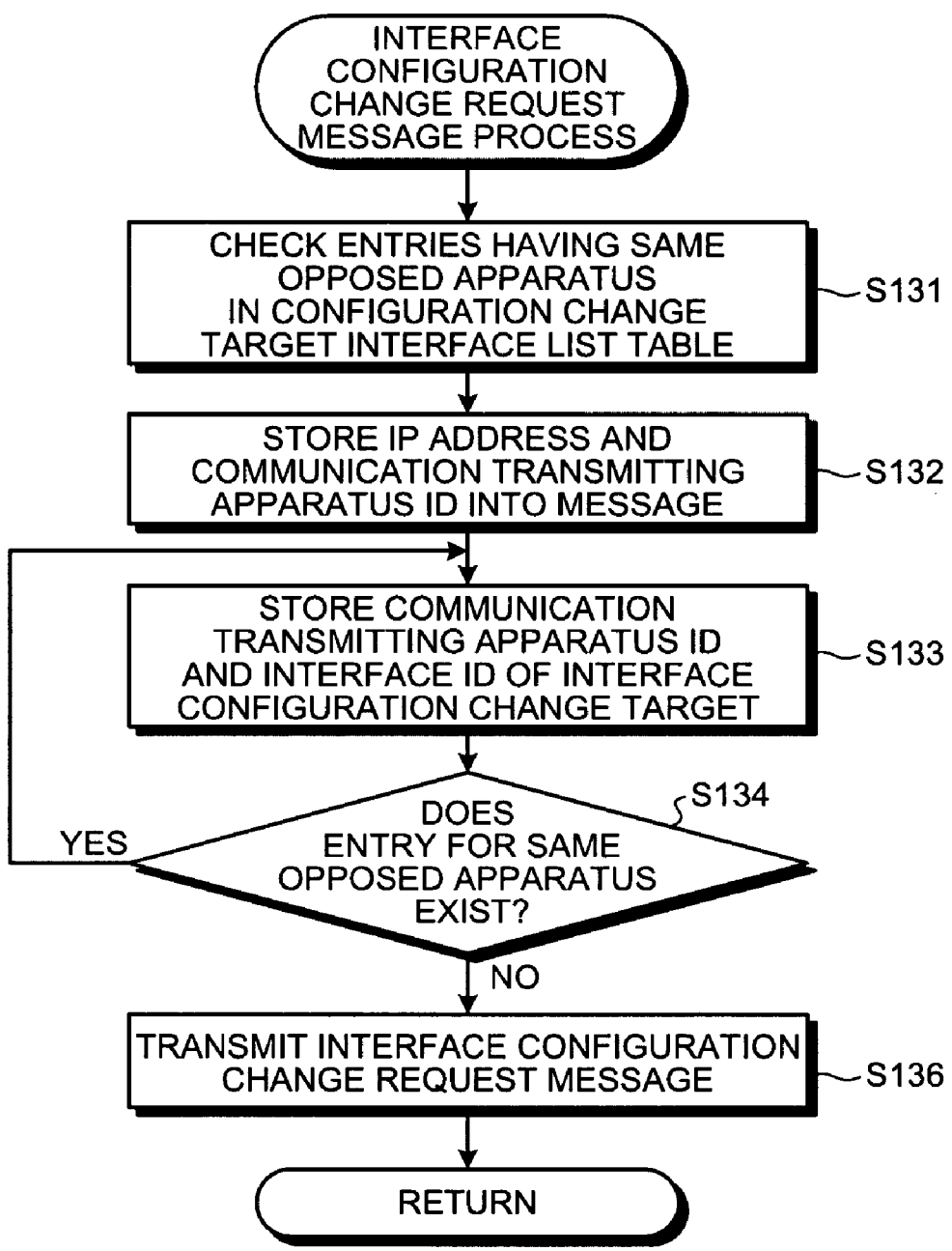

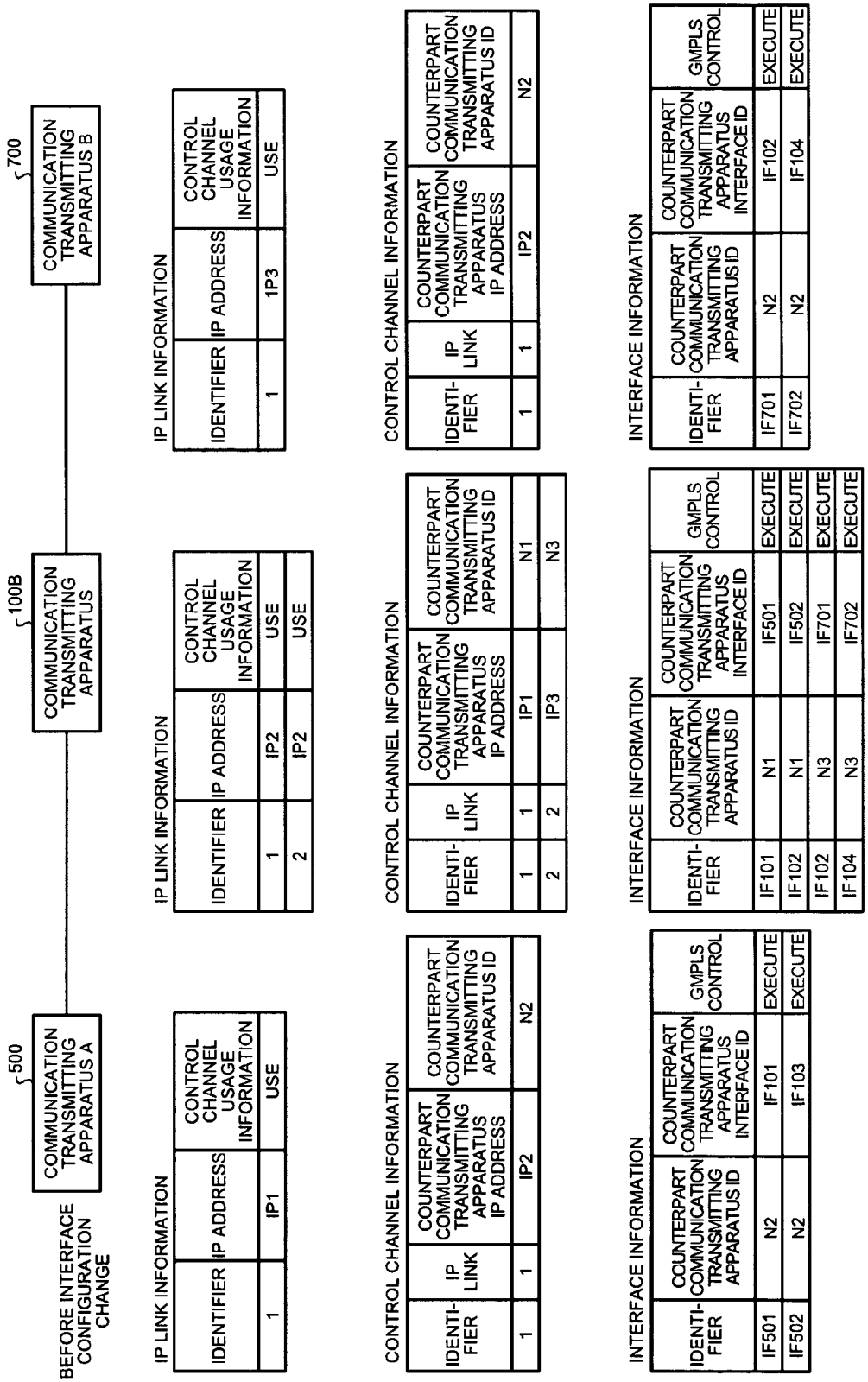

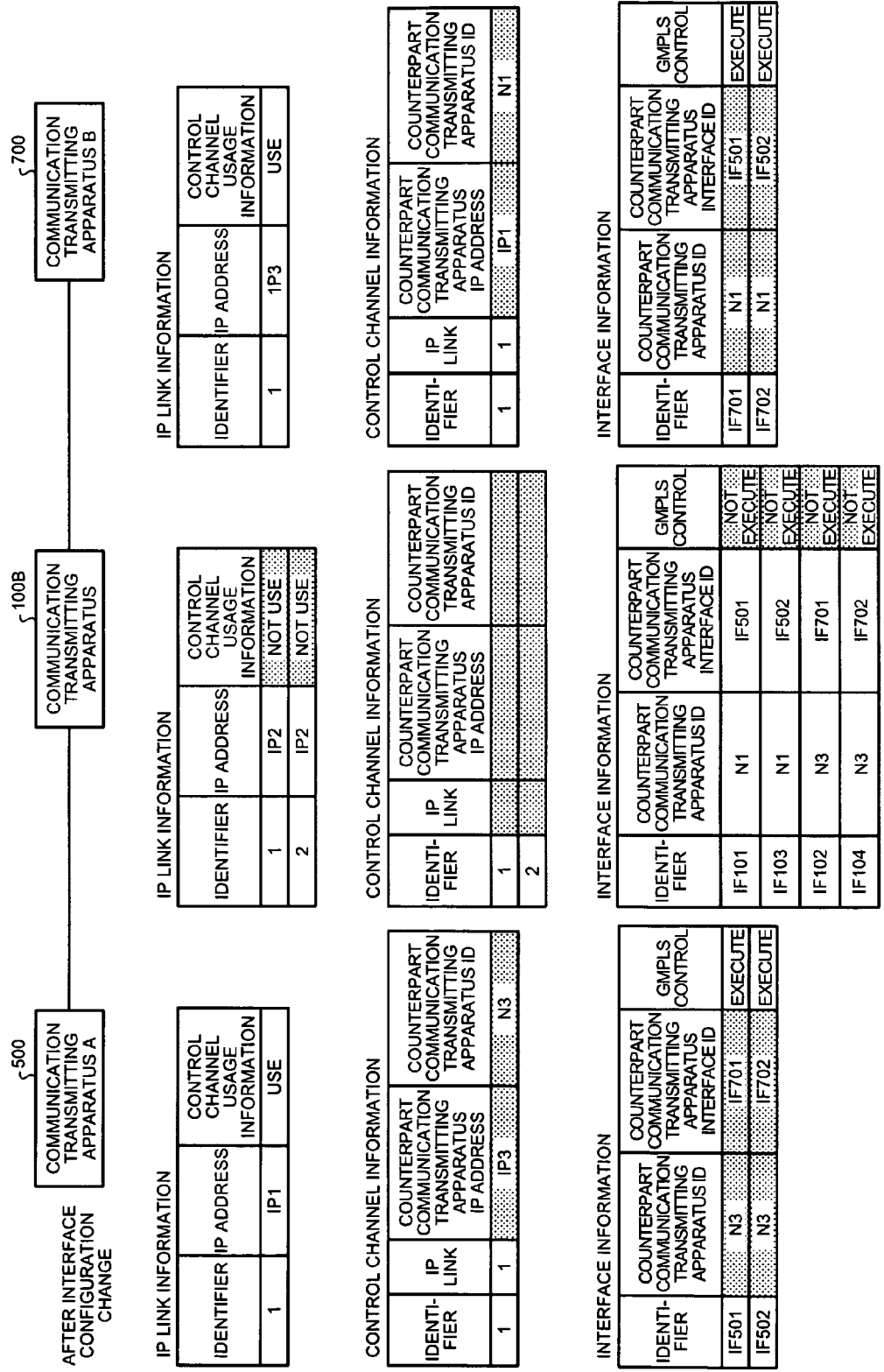

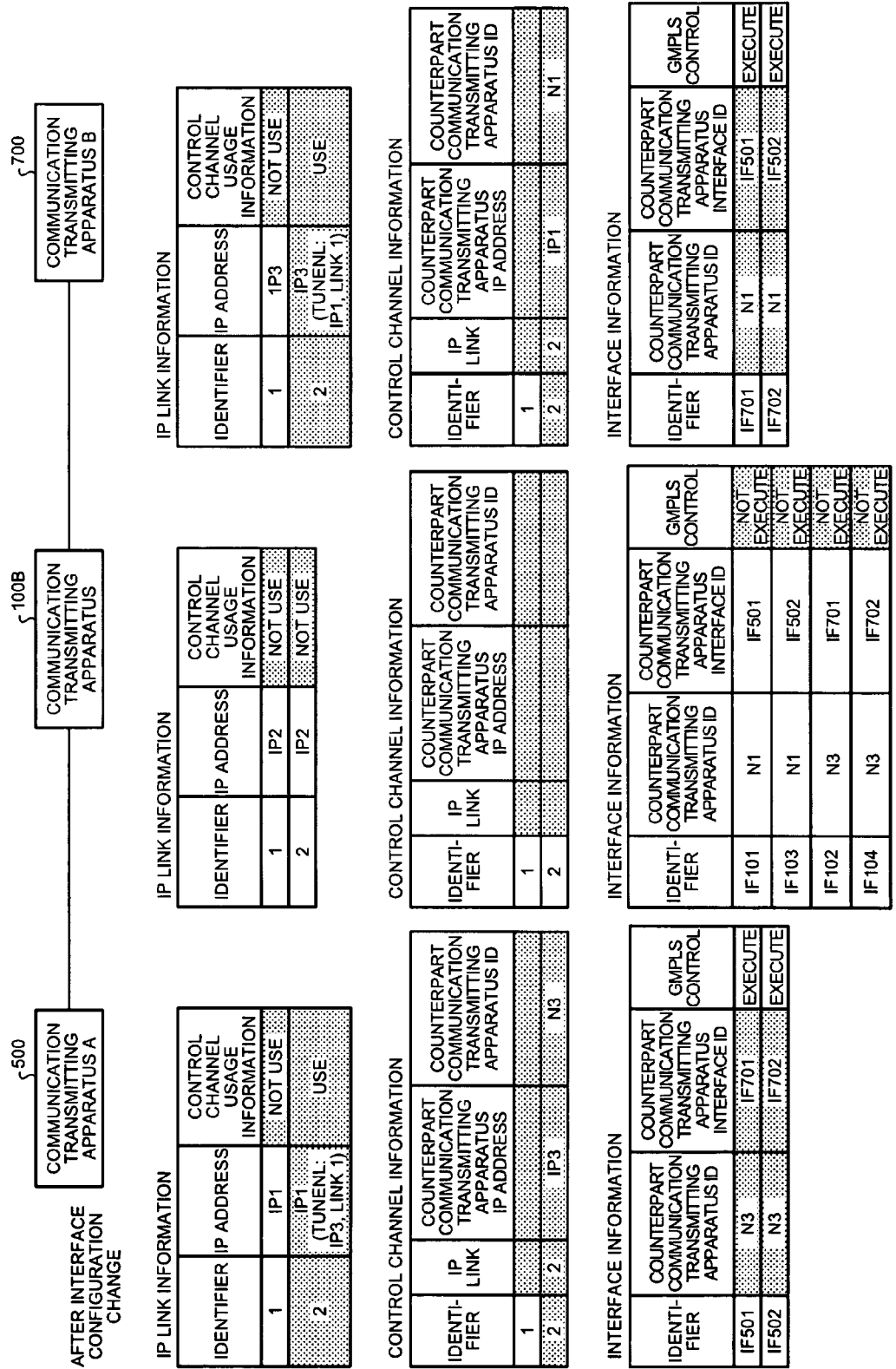

| COMMUNICATION TRANSMITTING APPARATUS A | | | COMMUNICATION TRANSMITTING APPARATUS B | | |
|---|---|---|---|---|---|
| INTERFACE ID | RESOURCE | UNIT OF SWITCHING | INTERFACE ID | RESOURCE | UNIT OF SWITCHING |
| IF101 | 1CH-24CH | 24CH | IF102 | 25CH-48CH | 24CH |
| IF101 | 25CH-48CH | 24CH | IF102 | 1CH-24CH | 24CH |
| IF103 | 1CH-48CH | 48CH | IF104 | 1CH-48CH | 48CH |

FIG.18

| INTER-FACE ID | COUNTERPART COMMUNICATION TRANSMITTING APPARATUS IP ADDRESS | COUNTERPART COMMUNICATION TRANSMITTING APPARATUS ID | COUNTERPART COMMUNICATION TRANSMITTING APPARATUS INTERFACE ID | DIRECT-LINK TARGET INTER-FACE ID | CONTROL CHANNEL CONTINUATION REQUEST FLAG |
|---|---|---|---|---|---|
| IF103 | IP1 | N1 | IF502 | IF104 | 1 |
| IF104 | IP3 | N3 | IF702 | IF103 | 1 |

FIG.19

| (1) | DESTINATION IP ADDRESS |
|---|---|
| (2) | SOURCE IP ADDRESS |
| (3) | SOURCE APPARATUS ID |
| (4) | CHANGED IP ADDRESS |
| (5) | CHANGED APPARATUS ID |
| (6) | CONTROL CHANNEL CONTINUATION REQUEST FLAG |
| (7) | CHANGE TARGET COMMUNICATION TRANSMITTING APPARATUS ID |
| (8) | CHANGE TARGET COMMUNICATION TRANSMITTING APPARATUS INTERFACE ID |
| (9) | CHANGED COMMUNICATION TRANSMITTING APPARATUS ID |
| (10) | CHANGED COMMUNICATION TRANSMITTING APPARATUS INTERFACE ID |

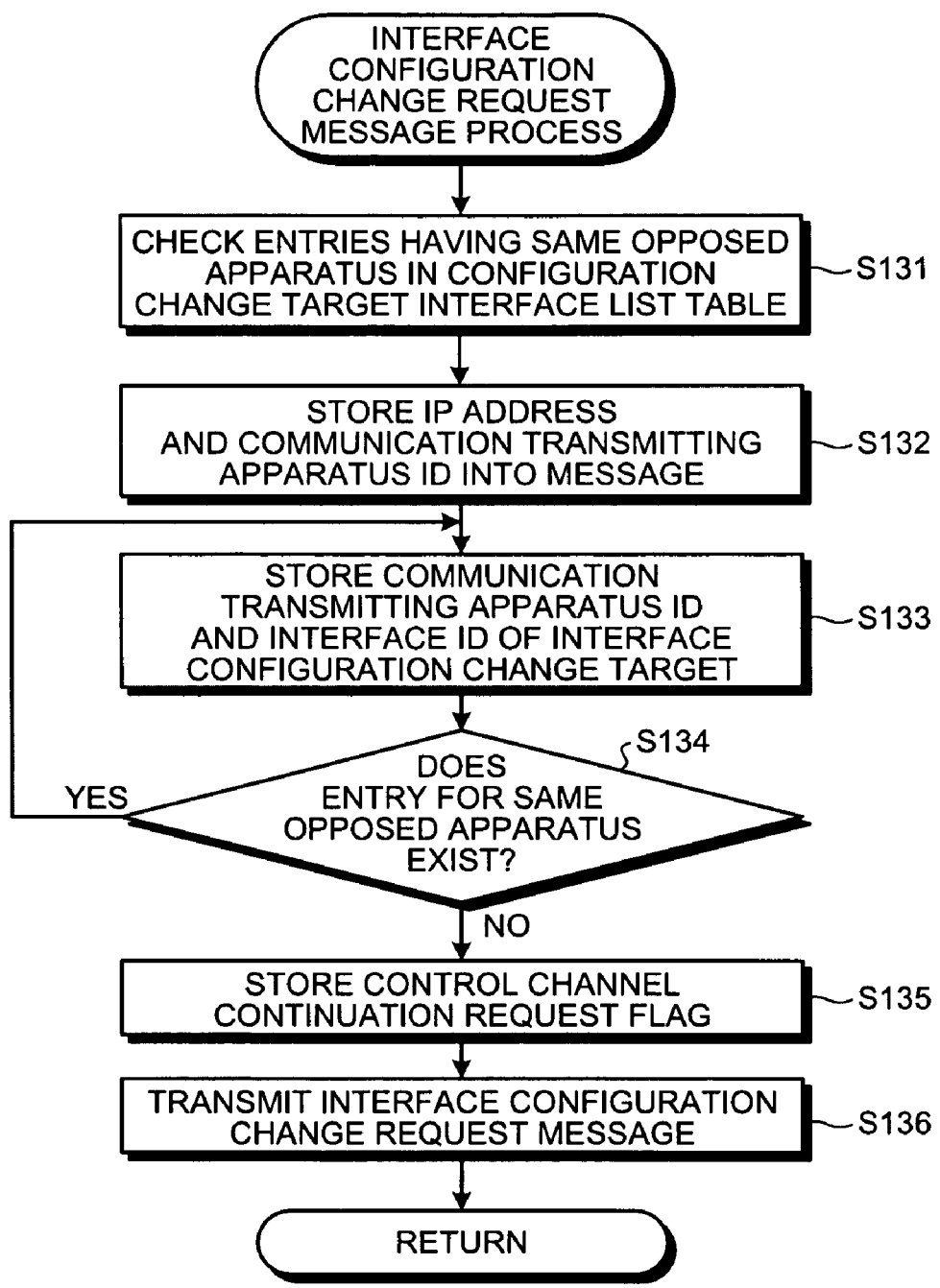

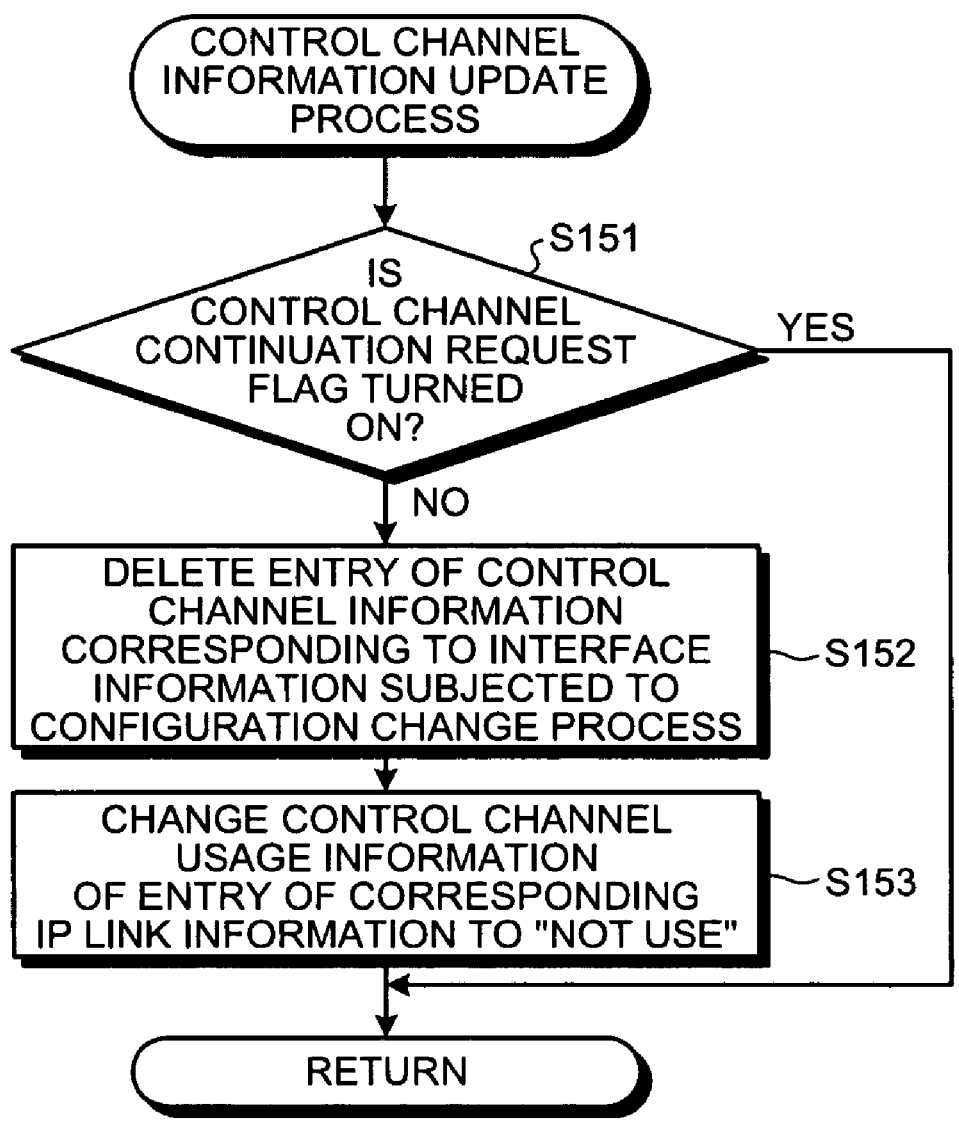

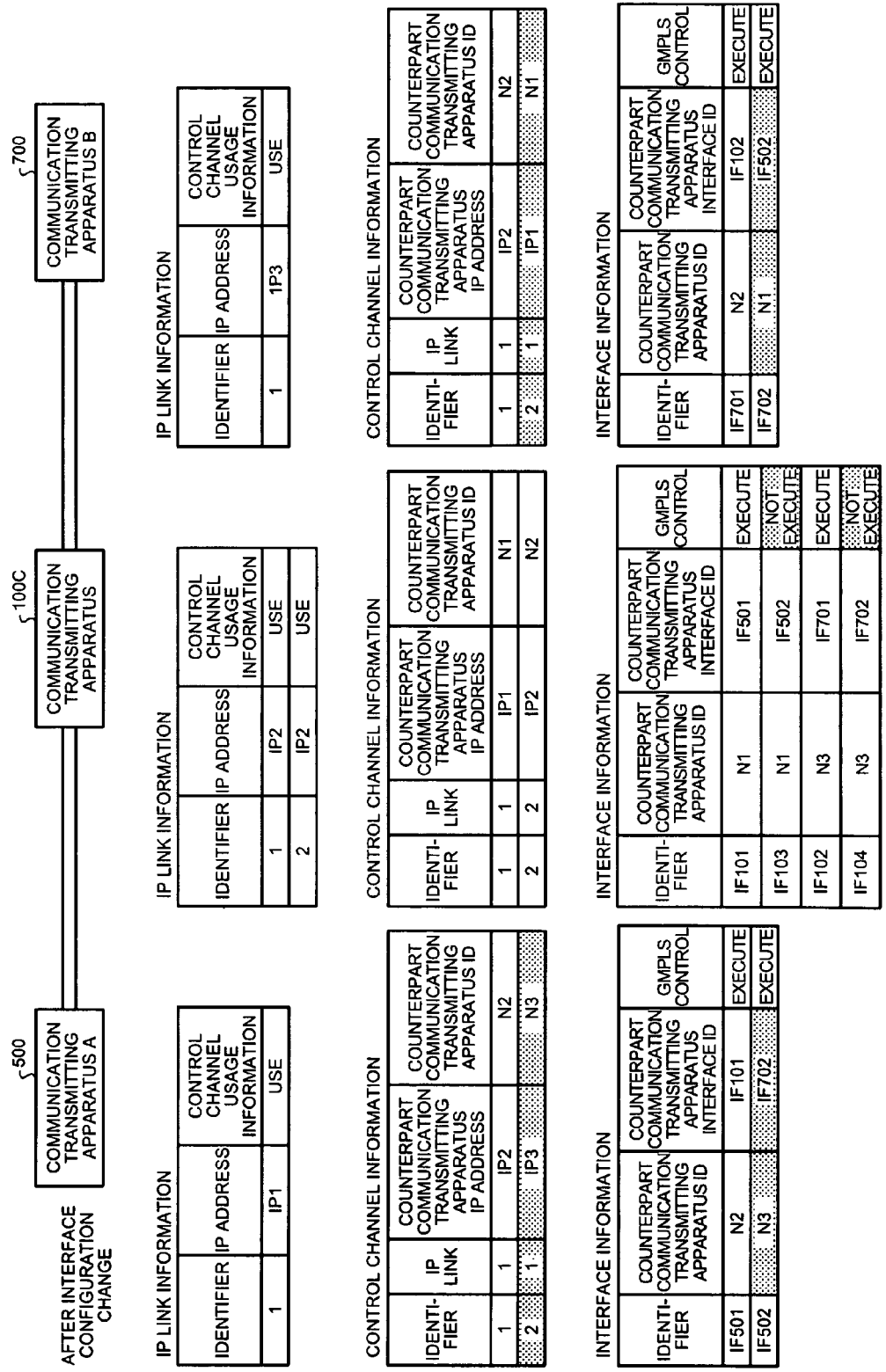

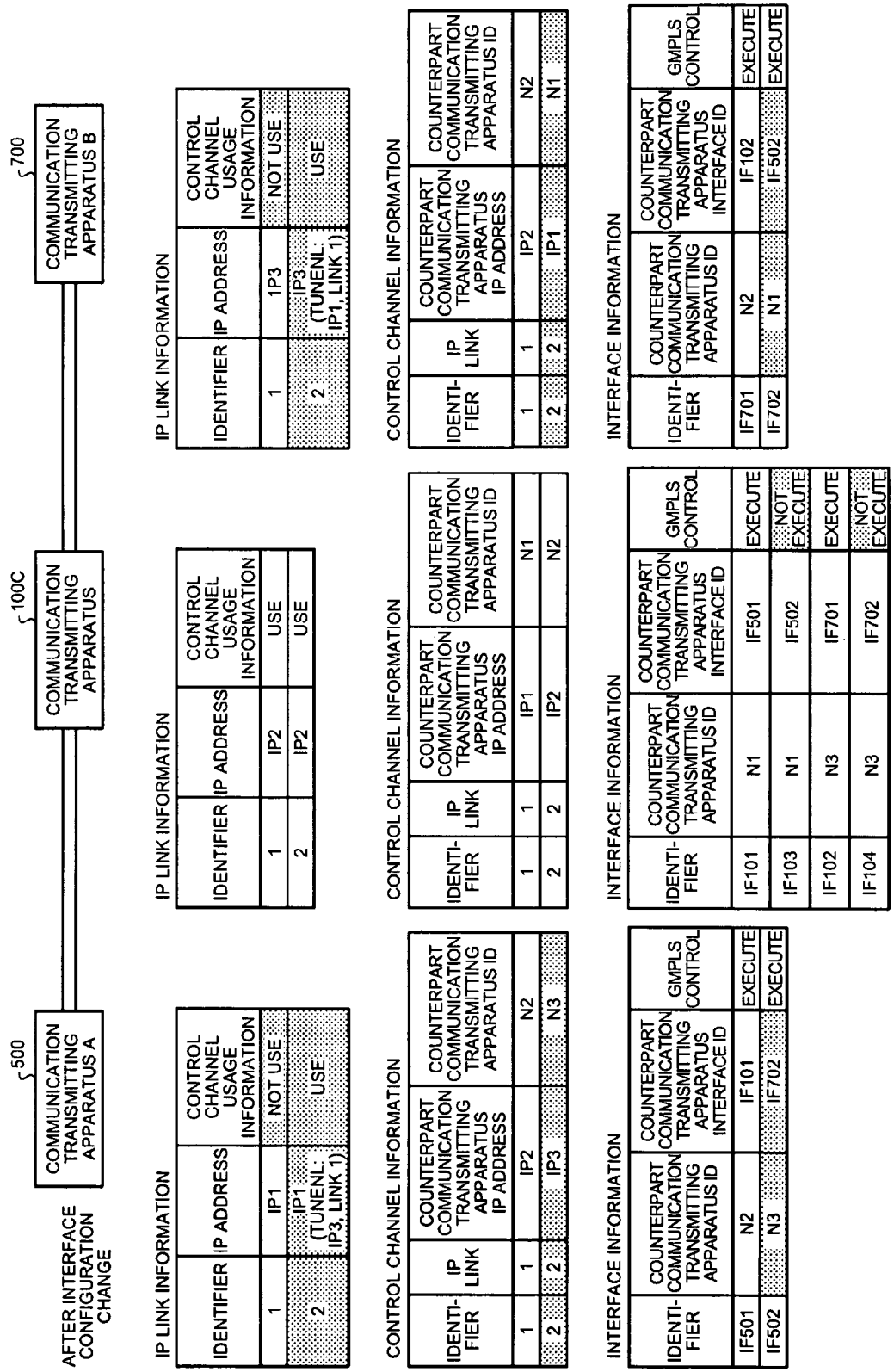

COMMUNICATION TRANSMITTING APPARATUS AND COMMUNICATION TRANSMITTING METHOD

BACKGROUND OF THE INVENTION

1. Field of the Invention

The present invention relates to a communication transmitting apparatus having an autonomous distributed controlling unit autonomously controls a network including an input communication transmitting apparatus and an output communication transmitting apparatus opposed through the own apparatus based on control information of a network made up of communication transmitting apparatuses disposed in a distributed manner, and a communication transmitting method in the communication transmitting apparatus.

2. Description of the Related Art

In optical communicating apparatuses such as routers in optical communication networks, a technology called GMPLS (Generalized Multi-Protocol Label Switching) is known that determines transfer routes based on wavelengths of optical signals to transfer optical signals as optical signals without change. Since optical signals are transferred without conversion into electric signals in GMPLS, optical signals may be transferred at higher speed without overhead of signal conversion and the high-speed nature of optical communication does not deteriorate.

Operation of GMPLS requires information indeterminable independently with the own apparatus in addition to the internal information (such as own apparatus ID and interface ID) managed by optical communication transferring apparatuses. Specifically, operation of GMPLS requires IP addresses and apparatus IDs of adjacent apparatuses that are counterparts of transmission/reception of control messages (IP (Internet Protocol) packets), apparatus IDs and interface IDs of opposed apparatuses connected through optical fibers in an optical communication network, etc. These pieces of information will hereinafter be referred to as necessary information.

The IP addresses and the apparatus IDs of the adjacent apparatuses are used when exchanging protocol messages of the signaling protocol (GMPLS RSVP-TE) or the routing protocol (GMPLS OSPF-TE) or used for the process thereof. The apparatus IDs and the interface IDs of the opposed apparatuses are used to establish fiber topology information managed by optical communicating apparatuses indicating connection relationship between the optical communication apparatuses.

Methods of acquiring the necessary information include a method of utilizing LMP (Link Management Protocol, RFC4204) that is a protocol of exchanging and acquiring the necessary information between apparatuses at the time of activation of the apparatuses. A plurality of GMPLS functions for operating GMPLS provided on the optical communication apparatuses acquire respective pieces of the necessary information through LMP. To avoid waste that the GMPLS functions redundantly acquire the necessary information, a communication controlling apparatus is proposed that acquires the necessary information through a single interface for shared management (Japanese Patent Application Laid-open No. 2004-320390).

However, although conventional technologies represented by Japanese Patent Application Laid-open No. 2004-320390 enable efficient management of the necessary information by eliminating redundant acquisition of the necessary information and sharing the acquired among the GMPLS functions, a so-called GMPLS scalability problem is not solved.

Specifically, the GMPLS scalability problem is as follows. An optical communication network must have a full-mesh configuration when only GMPLS is used. Therefore, if the optical communication network is connected to an external IP network, it is problematic that a path setting ability deteriorates since the enormous number of paths is generated in the entire network.

If it is attempted to ensure the reachability of optical signals among optical communicating apparatuses storing users only through optical fibers, an optical communication network must be configured in a full-mesh shape and it is problematic that a usage rate of an actually used band extremely decreases relative to a total band in this case.

Therefore, since the number of paths becomes enormous as above if optical communicating apparatuses set a route for each destination optical communicating apparatus, a route must be selected from enormous candidates and, therefore, it is problematic that the optical signal transfer ability may deteriorate in the optical communicating apparatuses.

SUMMARY

It is an object of the present invention to at least partially solve the problems in the conventional technology.

According to an aspect of the present invention, a communication transmitting apparatus includes an autonomous distributed controlling unit that autonomously controls a network including an input communication transmitting apparatus and an output communication transmitting apparatus opposed through the own apparatus based on network control information of a network made up of communication transmitting apparatuses disposed in a distributed manner; a control information storage unit that has stored thereon the network control information related to the own apparatus, the input communication transmitting apparatus and, the output communication transmitting apparatus; a transfer information storage unit that has stored thereon transfer information representing correlations of resources between a first interface and a second interface when communication data input from the input communication transmitting apparatus through the first interface are transferred to the output communication transmitting apparatus through the second interface; a fixed transfer information extracting unit that extracts fixed transfer information having the same resources correlated between the first interface and the second interface from the transfer information stored in the transfer information storage unit; a control information updating unit that updates the network control information related to the input communication transmitting apparatus and the output communication transmitting apparatus corresponding to the fixed transfer information extracted by the fixed transfer information extracting unit to exclude the own apparatus from the control of the autonomous distributed controlling unit with regard to the input communication transmitting apparatus and the output communication transmitting apparatus; and a control information update message processing unit that generates and transmits a control information update message to the input communication transmitting apparatus and the output communication transmitting apparatus to update the network control information stored thereon in accordance with update of the network control information in the own apparatus.

According to another aspect of the present invention, a communication transmitting method is performed by a communication transmitting apparatus having an autonomous distributed controlling unit that autonomously controls a network including an input communication transmitting apparatus and an output communication transmitting apparatus opposed through the own apparatus based on network control information of a network made up of communication transmitting apparatuses disposed in a distributed manner. The method includes extracting fixed transfer information having the same resources correlated between a first interface and a second interface from transfer information representing correlations of resources between the first interface and the second interface when communication data input from the input communication transmitting apparatus through the first interface are transferred to the output communication transmitting apparatus through the second interface; updating the network control information related to the own apparatus, the input communication transmitting apparatus, and the output communication transmitting apparatus corresponding to the fixed transfer information extracted at the fixed transfer information extracting step to exclude the own apparatus from the control of the autonomous distributed controlling unit with regard to the input communication transmitting apparatus and the output communication transmitting apparatus; and generating and transmitting a control information update message to the input communication transmitting apparatus and the output communication transmitting apparatus to update the network control information stored thereon in accordance with update of the network control information in the own apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a functional block diagram of a configuration of a communication transmitting apparatus according to a first embodiment;

FIG. 3A depicts an example of an IP link information table according to the first embodiment;

FIG. 3B depicts an example of an interface information table according to the first embodiment;

FIG. 3C depicts an example of a switching information table according to the first embodiment;

FIG. 4A depicts an example of a control channel information table according to the first embodiment;

FIG. 4B depicts an example of a configuration change target interface list table according to the first embodiment;

FIG. 5 depicts an exemplary format of an interface configuration change request message according to the first embodiment;

FIG. 7A is a flowchart of the interface configuration change request message receiving process of the first embodiment;

FIG. 11A depicts an example of an interface information table according to the second embodiment;

FIG. 11B depicts an example of a switching information table according to the second embodiment;

FIG. 12 depicts an example of a configuration change target interface list table according to the second embodiment;

FIG. 13 depicts an exemplary format of the interface configuration change request message according to the second embodiment;

FIG. 14 is a flowchart of the interface configuration change request message process procedure of the second embodiment;

FIG. 15A depicts stored values of various tables before the interface configuration change of the second embodiment;

FIG. 15B depicts changes in the stored values of various tables after the interface configuration change of the second embodiment (in the case of a system not using the IP tunnel);

FIG. 15C depicts changes in the stored values of various tables after the interface configuration change of the first embodiment (in the case of a system using the IP tunnel);

FIG. 18 depicts an example of a configuration change target interface list table according to the third embodiment;

FIG. 19 depicts an exemplary format of an interface configuration change request message according to the third embodiment;

FIG. 20 is a flowchart of the interface configuration change request message process procedure of the third embodiment;

FIG. 21 is a flowchart of the control channel information update process procedure of the third embodiment;

FIG. 25B depicts changes in the stored values of various tables after the interface configuration change of the third embodiment (in the case of a system not using the IP tunnel);

FIG. 25C depicts changes in the stored values of various tables after the interface configuration change of the third embodiment (in the case of a system using the IP tunnel);

DETAILED DESCRIPTION OF THE PREFERRED EMBODIMENTS

Exemplary embodiments according to a communication transmitting apparatus and a communication transmitting method of the present invention will hereinafter be described with reference to the accompanying drawings. A network described in first to fourth embodiment is assumed to be an optical communication network with optical fibers acting as transmission paths. Communication transmitting apparatuses making up nodes of the optical communication network have functions of performing the GMPLS operation for transferring optical signals in GMPLS. However, this is not a limitation of the present invention and the present invention is applicable to networks exchanging various IP packets. Especially, the present invention is not applicable only to the GMPLS operation but also widely applicable to communication transmitting apparatuses equipped with autonomous distributed control protocols for autonomously controlling communication transmitting apparatuses distributed on a network and a network made up of the communication transmitting apparatuses acting as nodes.

Figure 1:
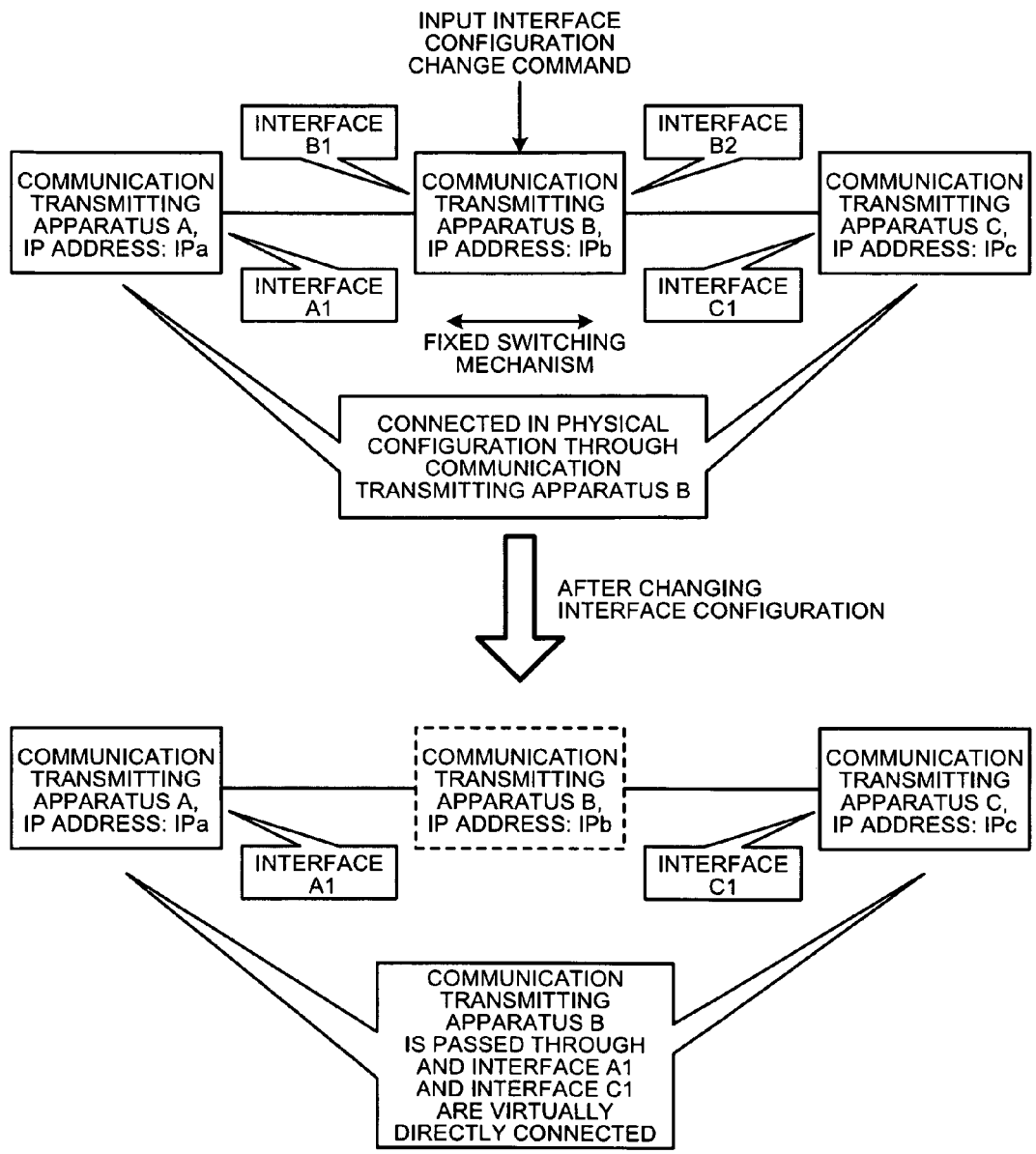
FIG. 1 depicts outlines and features of embodiments.

Outlines and features common to all the embodiments will first be described before describing the first to fourth embodiments. FIG. 1 depicts outlines and features of the embodiments. As shown in FIG. 1, a communication transmitting apparatus A having an IP address of IPa and an interface ID of A1 (an interface having the interface ID of A1 will be referred to as an interface A1) is opposed to a communication transmitting apparatus C having an IP address of IPc and an interface ID of C1 (an interface having the interface ID of C1 will be referred to as an interface C1) through a relaying apparatus that is a communication transmitting apparatus B having an IP address of IPb and interface IDs of B1 and B2 (an interface having the interface ID of B1 will be referred to as an interface B1 and an interface having the interface ID of B2 will be referred to as an interface B2).

It is assumed that the GMPLS operation is performed in a network made up by connecting the communication transmitting apparatuses A to C using optical fibers as transmission paths. That is, all the communication transmitting apparatuses A to C are target apparatuses of the GMPLS operation. The communication transmitting apparatus B is connected to the communication transmitting apparatus A through the interface B1 and connected to the communication transmitting apparatus C through the interface B2. Contrary, the communication transmitting apparatus A is connected to the communication transmitting apparatus B through the interface A1 and the communication transmitting apparatus C is connected to the communication transmitting apparatus B through the interface C1.

The communication transmitting apparatus B exchanges optical signals between the interface B1 and the interface B2 in a fixed switching mechanism. The fixed switching mechanism means straight connection having the input interface and the output interface fixedly correlated and channel resources delivering/receiving optical signals between the resources with the same channel number.

The "communication transmitting apparatus A and the communication transmitting apparatus C" are referred to as "opposed communication transmitting apparatuses (opposed nodes)", and the "communication transmitting apparatus A and the communication transmitting apparatus B" and the "communication transmitting apparatus B and the communication transmitting apparatus C" are referred to as "adjacent communication transmitting apparatuses (adjacent nodes)". That is, the opposite node of the communication transmitting apparatus A is the communication transmitting apparatus C, and the opposite node of the communication transmitting apparatus C is the communication transmitting apparatus A. The adjacent node of the communication transmitting apparatus A is the communication transmitting apparatus B; the adjacent nodes of the communication transmitting apparatus B are the communication transmitting apparatus A and the communication transmitting apparatus C; and the adjacent node of the communication transmitting apparatus C is the communication transmitting apparatus B.

When the opposed communication transmitting apparatuses A and C are connected in the physical configuration thorough the communication transmitting apparatus B in this way, an interface configuration changing command is input to the communication transmitting apparatus B. As a result, the interface configuration is changed in the communication transmitting apparatus B and virtual connection is achieved such that the opposed communication transmitting apparatuses A and C pass through the communication transmitting apparatus B to directly connect the interface A1 and the interface C1 as shown. In this situation, the GMPLS operation target apparatuses are only the communication transmitting apparatus A and the communication transmitting apparatus C, and the communication transmitting apparatus B is a non-target apparatus of the GMPLS operation.

By changing the interface configuration such that the interfaces are logically directly connected for the two opposite communication transmitting apparatuses having a communication transmitting apparatus only relaying signals on the transmission path, the same effect can be achieved as driving the communication transmitting apparatus only relaying optical signals to be the GMPLS operation non-target apparatus to terminate the GMPLS process in the communication transmitting apparatus. The GMPLS scalability problem is solved and the communication transmitting apparatus B may transfer optical signals at higher speed.

First Embodiment

A first embodiment will hereinafter be described with reference to FIGS. 2 to 9. It is assumed in the first embodiment that three communication transmitting apparatuses are connected through one optical fiber for each apparatus and that a communication transmitting apparatus 100A relays optical signals between two opposed communication transmitting apparatuses.

A configuration of the communication transmitting apparatus 100A will first be described. FIG. 2 is a functional block diagram of the configuration of the communication transmitting apparatus 100A according to the first embodiment. As shown in FIG. 2, the communication transmitting apparatus 100A includes a controlling unit 101, a resource information storage unit 102, a channel information storage unit 103, a varied definition information storage unit 104, a terminal-apparatus interface unit 109, a communication interface unit A 105, and a communication interface unit B 106. A standard communication function of the communication transmitting apparatus 100A is not shown in FIG. 2.

The communication transmitting apparatus 100A is connected through the communication interface unit A 105 to a communication transmitting apparatus A 500 and connected through the communication interface unit B 106 to a communication transmitting apparatus B 700. That is, the adjacent node of the communication transmitting apparatus A 500 is the communication transmitting apparatus 100A; the adjacent nodes of the communication transmitting apparatus 100A are the communication transmitting apparatus A 500 and the communication transmitting apparatus B 700; and the adjacent node of the communication transmitting apparatus B 700 is the communication transmitting apparatus 100A. The communication transmitting apparatus A 500 and the communication transmitting apparatus B 700 have the same configuration as the communication transmitting apparatus 100A in the first embodiment.

The communication transmitting apparatus 100A has an apparatus ID "N2" and an IP address "IP2"; the communication interface unit A 105 has an interface ID "IF101"; and the communication interface unit B 106 has an interface ID "IF102". The communication transmitting apparatus A 500 has an apparatus ID "N1" and an IP address "IP1", and a communication interface unit not shown has an interface ID "IF501".

The communication transmitting apparatus B 700 has an apparatus ID "N3" and an IP address "IP2", and a communication interface unit not shown has an interface ID "IF701". The communication transmitting apparatus A 500 and the communication transmitting apparatus 100A are connected through the interfaces of "IF501" and "IF101", respectively. The communication transmitting apparatus 100A and the communication transmitting apparatus B 700 are connected through the interfaces of "IF102" and "IF701", respectively.

The controlling unit 101 is a controlling device responsible for the overall control of the communication transmitting apparatus 100A and includes an input command processing unit 101a, an interface configuration change processing unit 101b, and an adjacent node detection processing unit 101c, which are constituent elements particularly related to the first embodiment.

The resource information storage unit 102 is a storage device that has stored thereon an IP link information table 102a, an interface information table 102b, and a switching information table 102c. The channel information storage unit 103 is a storage device that has stored thereon a control channel information table 103a and a configuration change target interface list table 103b. The varied definition information storage unit 104 is a storage device that has stored thereon the apparatus ID, the allocated IP address, etc., of the communication transmitting apparatus 100A. The resource information storage unit 102, the channel information storage unit 103, and the varied definition information storage unit 104 may physically be integrated or may be suitably divided into separate bodies.

The IP link information table 102a is a table for entering IP link information, including columns of "identifier", "IP address", and "control channel usage information" as shown in FIG. 3A. The "identifier" is identification information for uniquely identifying an entry of the IP link information table 102a. The "IP address" is an IP addresses used when the communication transmitting apparatus 100A communicates with a counterpart communication transmitting apparatus. The "control channel usage information" is information indicating whether a GMPLS control channel is utilized when communicating with a counterpart communication transmitting apparatus for the "IP address" registered in each entry.

From FIG. 3A, it can be seen that when the "IP address" of "IP2" stored in the entry with the "identifier" of "1" is used to communicate with a counterpart communication transmitting apparatus, the "communication channel information" is utilized and that when the "IP address" of "IP2" stored in the entry with the "identifier" of "2" is used to communicate with a counterpart communication transmitting apparatus, the "communication channel information" is utilized as well.

The interface information table 102b is a table for entering interface information, including columns of "identifier", "counterpart communication transmitting apparatus ID", "counterpart communication transmitting apparatus interface ID", and "GMPLS control" as shown in FIG. 3B. The "identifier" is identification information for uniquely identifying an entry of the interface information table 102b. The "counterpart communication transmitting apparatus ID" is an apparatus ID of a counterpart communication transmitting apparatus connected through an interface identified by the "identifier". The "counterpart communication transmitting apparatus interface ID" is an interface ID of a counterpart communication transmitting apparatus connected through an interface identified by the "identifier". The "GMPLS control" is information indicating whether the GMPLS control is performed in the communication with a counterpart communication transmitting apparatus connected through an interface identified by the "identifier".

From FIG. 3B, it can be seen that a connection is made to a counterpart communication transmitting apparatus having the "counterpart communication transmitting apparatus ID" of "N1" stored in the entry with the "identifier" of "IF101" through the "counterpart communication transmitting apparatus interface ID" of "IF501" of the counterpart communication transmitting apparatus, and that the "GMPLS control" is utilized. It can also be known that a connection is made to a counterpart communication transmitting apparatus having the "counterpart communication transmitting apparatus ID" of "N3" stored in the entry with the "identifier" of "IF102" through the "counterpart communication transmitting apparatus interface ID" of "IF701" of the counterpart communication transmitting apparatus, and that the "GMPLS control" is utilized.

The switching information table 102c is a table for entering switching information, including columns of "interface ID", "resource", and "unit of switching" of the communication transmitting apparatus A 500 and "interface ID", "resource", and "unit of switching" of the communication transmitting apparatus B 700 as shown in FIG. 3C.

The "interface ID" of the communication transmitting apparatus A 500 is identification information of an interface connected to the communication transmitting apparatus A 500. The "resource" of the communication transmitting apparatus A 500 is information about a channel utilized by an interface identified with the "interface ID". The "unit of switching" of the communication transmitting apparatus A 500 is information indicating a unit of resource causing the switching.

The "interface ID" of the communication transmitting apparatus B 700 is identification information of an interface connected to the communication transmitting apparatus B 700. The "resource" of the communication transmitting apparatus B 700 is information about a channel utilized by an interface identified with the "interface ID". The "unit of switching" of the communication transmitting apparatus B 700 is information indicating a unit of resource causing the switching.

From FIG. 3C, it can be seen that the communication interface unit A 105 of "IF101" has channels from 1 CH to 48 CH and performs the switching every 48 CH, that the communication interface unit B 106 of "IF102" has channels of resources from 1CH to 48CH and performs the switching every 48 CH, and that the "fixed switch mechanism" is implemented by the straight connection from all the channels of "IF101" to the channels having the same numbers.

The control channel information table 103a is a table for entering control channel information, including columns of "identifier", "IP link", "counterpart communication transmitting apparatus IP address", and "counterpart communication transmitting apparatus ID" as exemplarily shown in FIG. 4A. The "identifier" is identification information for uniquely identifying an entry of the control channel information table 103a. The "IP link" is the "identifier" indicating an entry of the IP link information table 102a. The "counterpart communication transmitting apparatus IP address" is an IP address of a counterpart communication transmitting apparatus in the communication using the "IP link". The "counterpart communication transmitting apparatus ID" indicates an apparatus ID of a counterpart communication transmitting apparatus in the communication using the "IP link".

From FIG. 4A, it can be seen that an IP address of the counterpart communication transmitting apparatus is "IP1" in the communication using the "IP link" with the "identifier" of "1" and that an IP address of the counterpart communication transmitting apparatus is "IP3" in the communication using the "IP link" with the "identifier" of "2".

The configuration change target interface list table 103b is a table for an entering configuration change target interface list, including columns of "interface ID", "counterpart communication transmitting apparatus IP address", "counterpart communication transmitting apparatus ID", "counterpart communication transmitting apparatus interface ID", and "direct-link target interface ID" as shown in FIG. 4B.

The "interface ID" is an interface ID of the communication interface unit of the communication transmitting apparatus 100A. The "counterpart communication transmitting apparatus IP address" is an IP address of a counterpart communication transmitting apparatus connected through the interface of the "interface ID". The "counterpart communication transmitting apparatus ID" is an apparatus ID of a counterpart communication transmitting apparatus connected through the interface of the "interface ID". The "counterpart communication transmitting apparatus interface ID" is an interface ID of a counterpart communication transmitting apparatus connected through the interface of the "interface ID". The "direct-link target interface ID" is ID of an interface of the communication transmitting apparatus 100A capable of directly linking with the interface of the "interface ID" to cause the communication transmitting apparatus 100A to be virtually passed through and excluded from the operation of GMPLS in the communication between the communication transmitting apparatus A 500 and the communication transmitting apparatus B 700.

From FIG. 4B, it can be seen that the communication transmitting apparatus 100A may logically be passed through and may be excluded from the operation of GMPLS by directly linking the interfaces with the "interface ID" of "IF101" and "IF102" (i.e., the communication interface unit A 105 and the communication interface unit B 106).

The input command processing unit 101a accepts an "interface configuration changing command" input from a terminal apparatus 300 through the terminal-apparatus interface unit 109 and instructs the interface configuration change processing unit 101b to change the interface configuration.

When receiving the instruction of changing the interface configuration, the interface configuration change processing unit 101b generates a configuration change target interface list based on a result of extracting the "fixed switching mechanism" from the switching information table 102c. The configuration change target interface list is entered into the configuration change target interface list table 103b.

The control channel information corresponding to the configuration change target interface is deleted from the control channel information table 103a based on the information of the configuration change target interface list. The IP link information and the interface information corresponding to the configuration change target interface are appropriately updated. Subsequently, the entries related to the interface with the configuration changed are deleted from the configuration change target interface list.

Based on the IP link information and the interface information updated in the communication transmitting apparatus 100A, the interface configuration change processing unit 101b generates and transmits to the target counterpart communication transmitting apparatus an interface configuration change request message giving an instruction to update the control channel information and the interface information.

A format of the interface configuration change request message includes fields of "destination IP address", "source IP address", "source apparatus ID", "changed IP address", "changed apparatus ID", "change target communication transmitting apparatus ID", "change target communication transmitting apparatus interface ID", "changed communication transmitting apparatus ID", and "changed communication transmitting apparatus interface ID" as shown in an example of FIG. 5.

The "destination IP address" is an IP address of the communication transmitting apparatus requested to change the interface configuration. The "source IP address" is an IP address of the communication transmitting apparatus that transmits the interface configuration change request message. The "source apparatus ID" is an apparatus ID of the communication transmitting apparatus that transmits the interface configuration change request message. The "changed IP address" is an IP address of a counterpart communication transmitting apparatus of the changed control channel of the communication transmitting apparatus requested to change the interface configuration. The "changed apparatus ID" is an ID of a counterpart communication transmitting apparatus of the changed control channel of the communication transmitting apparatus requested to change the interface configuration.

The "change target communication transmitting apparatus ID" is an apparatus ID of a communication transmitting apparatus to be changed, which is included in the interface information of the communication transmitting apparatus requested to change the interface configuration. The "change target communication transmitting apparatus interface ID" is an interface ID of a communication transmitting apparatus to be changed, which is included in the interface information of the communication transmitting apparatus requested to change the interface configuration.

The "changed communication transmitting apparatus ID" is an apparatus ID of a changed communication transmitting apparatus included in the interface information of the communication transmitting apparatus requested to change the interface configuration. The "changed communication transmitting apparatus interface ID" is an interface ID of a changed communication transmitting apparatus included in the interface information of the communication transmitting apparatus requested to change the interface configuration.

The above format of the interface configuration change request message includes the fields of, for example, 32-bit length and may be a variable TLV (Type Length Value) format such as those used in RSVP (Resource reSerVation Protocol) and OSPF (Open Shortest Path First). The fields may be arranged in any orders and the fields may suitably be combined as needed.

When receiving the interface configuration change request message, the interface configuration change processing unit 101b updates the control channel information and the interface information of the own apparatus in accordance with contents of the instruction of the interface configuration change request message.

The adjacent node detection processing unit 101c collects the IP address, the apparatus ID, the interface ID, etc., of the adjacent communication transmitting apparatus with the use of a protocol such as LMP to generate the control channel information. The IP link information, the interface information, and the control channel information respectively shown in FIGS. 3A, 3B, and 4A are pieces of information generated by the adjacent node detection processing unit 101c and indicate a state before the update by the interface configuration change processing unit 101b.

Figure 6A:
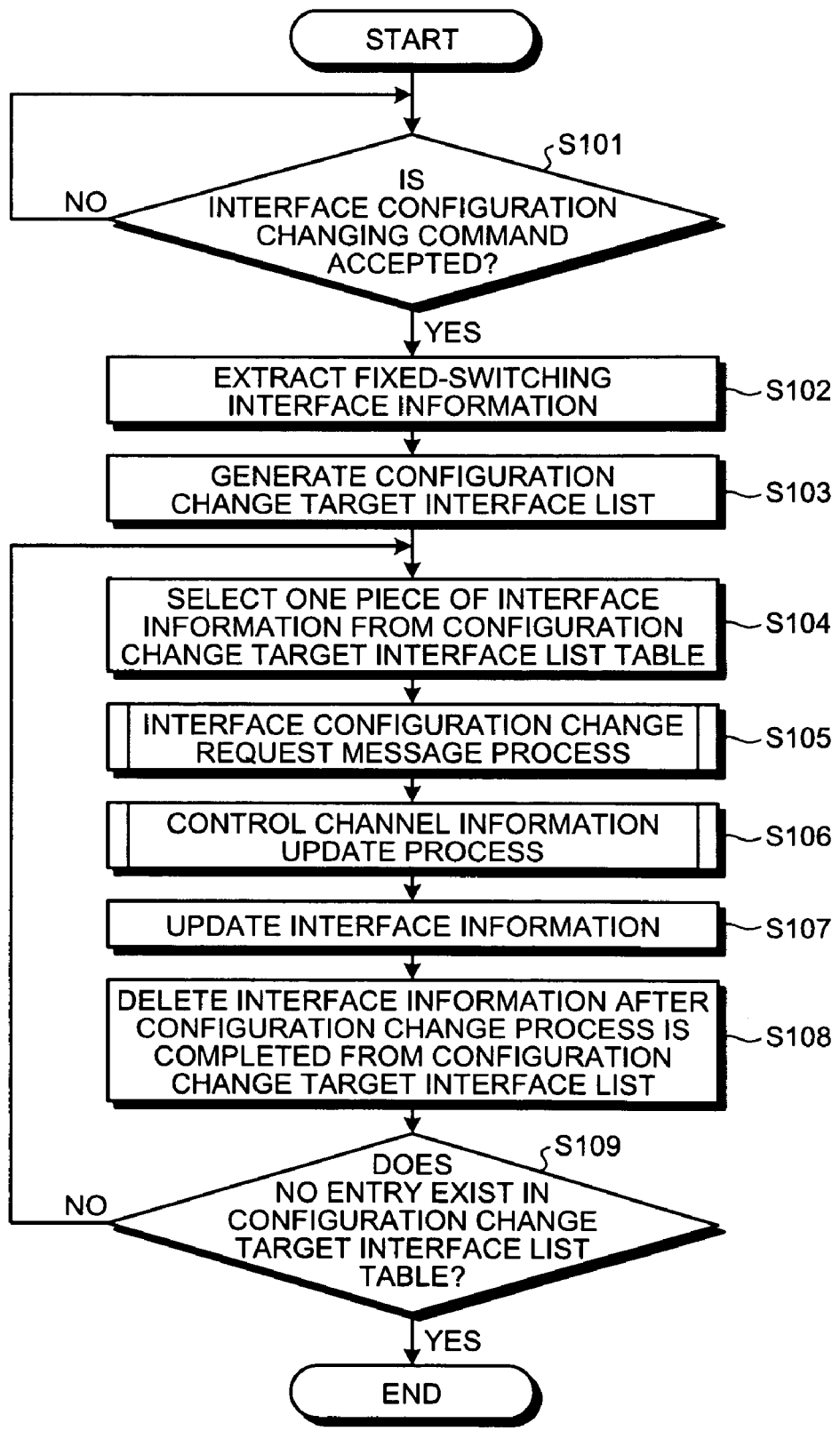
FIG. 6A is a flowchart of the interface configuration changing command accepting process procedure of the first embodiment.

An interface configuration changing command accepting process will be described which is executed by the communication transmitting apparatus 100A shown in FIG. 2. FIG. 6A is a flowchart of the interface configuration changing command accepting process procedure of the first embodiment. As shown in FIG. 6A, first, the input command processing unit 101a determines whether the interface configuration changing command is accepted (step S101). If it is determined that the interface configuration changing command is accepted (step S101, Yes), the process goes to step S102, and if it is determined that the interface configuration changing command is not accepted (step S101, No), step S101 is repeated.

At step S102, the interface configuration change processing unit 101b refers to the switching information table 102c to extract the fixed-switching interface information. Based on the interface information extracted at step S102, the interface configuration change processing unit 101b generates the configuration change target interface list, which is entered into the configuration change target interface list table 103b.

The interface configuration change processing unit 101b refers to the configuration change target interface list table 103b to select one piece of the fixed-switching interface information (step S104). The interface configuration change processing unit 101b then executes an interface configuration change request message process (step S105). Details of the interface configuration change request message process will be described later with reference to FIG. 6B.

The interface configuration change processing unit 101b then executes a control channel information update process of updating the control channel information entered in the control channel information table 103a (step S106). Details of the control channel information update process will be described later with reference to FIG. 6C.

The interface configuration change processing unit 101b then executes an interface information update process of updating the interface information entered in the interface information table 102b (step S107). The interface configuration change processing unit 101b deletes the interface information after the configuration change process is completed from the configuration change target interface list entered in the configuration change target interface list table 103b (step S108).

The interface configuration change processing unit 101b then refers to the configuration change target interface list table 103b to determine whether no entry exists (step S109). If it is determined that no entry exists (step S109, Yes), the interface configuration changing command accepting process is terminated, and if it is not determined that no entry exists (step S109, No), the process goes to step S104.

The extraction of the fixed-switching interface information at step S102 is performed by extracting a combination of interfaces satisfying the following three conditions.

(Condition 1) A first interface and a second interface are interfaces having the same attributes (such as switching ability, encoding ability, and bit rate).

(Condition 2) The switching is performed such that all the resources received by the first interface are output at the second interface without changing the positions (time slots carrying data signals in the case of TDM (Time Division Multiplexing), or wavelengths carrying data signals in the case of WDM (Wavelength Division Multiplexing)). That is, data received at the resource No. N (N≧1) of the first interface are output from the resource No. M (N=M) of the second interface.

(Condition 3) If the direction of the data signal switching is opposite to the above case (Condition 2), the switching is performed such that all the resources received by the second interface are output at the first interface without changing the positions (time slots carrying data signals in the case of TDM (Time Division Multiplexing), or wavelengths carrying data signals in the case of WDM (Wavelength Division Multiplexing)). That is, data received at the resource No. M (M≧1) of the second interface are output from the resource No. N (N=M) of the first interface.

Sufficiency of these conditions can be determined with the following method.

(1) One interface is extracted that is entered in the switching information (i.e., after the setting is performed). This extracted interface is referred to as an internet X. If this extracted interface X is already checked as a non-target interface of configuration change, another interface is selected.

(2) An interface Y is extracted that has the switching setting for outputting the data received by the interface X. If a plurality of candidates of the interface Y exists, it is determined that the interface X does not have the fixed switching setting, and the interface X is stored as a non-target interface of configuration change in a predetermined storage area. It is also determined that the interface Y does not have the fixed switching setting, and the interface Y is stored as a non-target interface of configuration change.

(3) All the interfaces having the switching setting are checked by repeating above (1) and (2) to list all the pairs switched one-on-one from the viewpoint of interface. Among the combinations of extracted interfaces, combinations having unmatched bit rates and other attributes (switching ability and encoding ability) are excluded as non-target interfaces of configuration change.

(4) Only the combinations switched (straight-connected) without interchanging resources are extracted from the combinations of extracted interfaces. This means combinations switched such that data received by the interface X are output at the same resource position at Y. This is checked in all the interface combinations. All the interfaces included in the interface combinations not satisfying this condition are defined as non-target interfaces of configuration change.

(5) The interface combinations remaining after (4) are then checked in the opposite direction of the switching. That is, the combinations are checked in the direction from the interface Y to the inter face X. Only the interface combinations satisfying the condition of (4) are extracted in the opposite direction. All the interfaces included in the interface combinations not satisfying the condition of (4) are defined as non-target interfaces of configuration change.

(6) The remaining interface combinations after the above check are the fixed-switching interface combinations, and interfaces included in these combinations are the configuration change target interfaces.

Figure 6B:
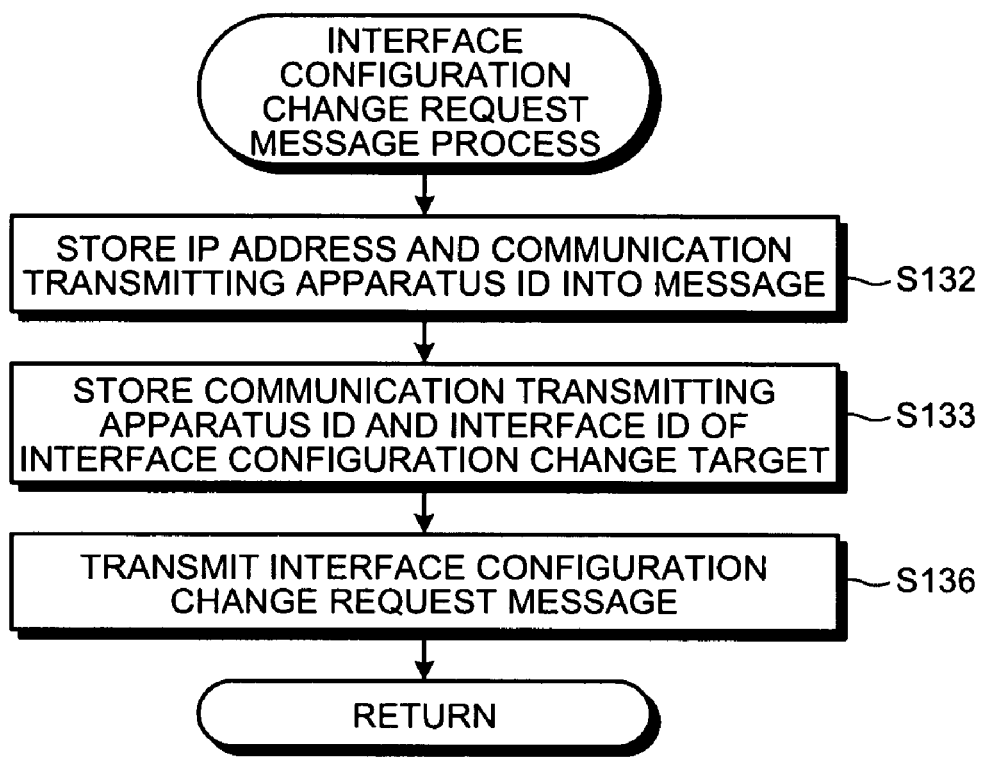
FIG. 6B is a flowchart of the interface configuration change request message process procedure of the first embodiment.

The interface configuration change request message process executed at step S105 of FIG. 6A will then be described. FIG. 6B is a flowchart of the interface configuration change request message process procedure of the first embodiment. The interface configuration change processing unit 101b first refers to the configuration change target interface list table 103b to store the "destination IP address", the "source IP address", the "source apparatus ID", the "changed IP address", and the "changed apparatus ID" into respective fields of the interface configuration change request message (step S132).

The interface configuration change processing unit 101b then refers to the configuration change target interface list table 103b to store the "change target communication transmitting apparatus ID", the "change target communication transmitting apparatus interface ID", the "changed communication transmitting apparatus ID", and the "changed communication transmitting apparatus interface ID" into respective fields of the interface configuration change request message (step S133). The interface configuration change processing unit 101b then transmits the interface configuration change request message generated in the above process to a destination counterpart communication transmitting apparatus (step S136). After this process is completed, the procedure returns to step S106 of FIG. 6A.

Figure 6C:
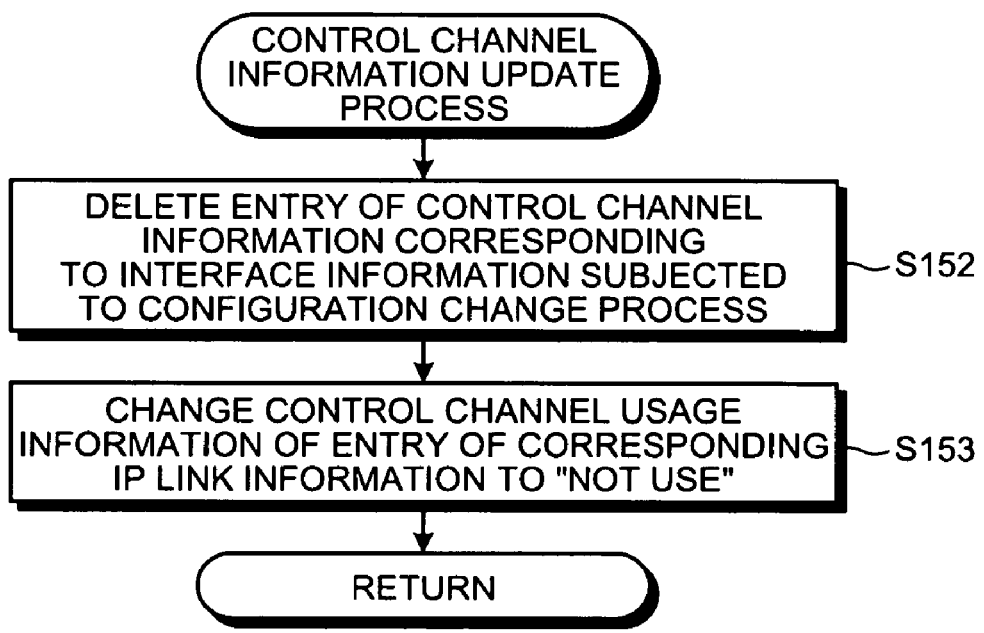
FIG. 6C is a flowchart of the control channel information update process procedure of the first embodiment.

The control channel information update process executed at step S106 of FIG. 6A will then be described. FIG. 6C is a flowchart of the control channel information update process procedure of the first embodiment. The interface configuration change processing unit 101b first deletes from the control channel information table 103a an entry of control channel information corresponding to the interface information to be subjected to the configuration change process (step S152).

The interface configuration change processing unit 101b then changes the "control channel usage information" to "not use" for an entry of the IP link information corresponding to the interface information to be subjected to the configuration change process (steps S153). After this process is completed, the procedure returns to step S107 of FIG. 6A.

An interface configuration change request message receiving process executed by the communication transmitting apparatus 100A of FIG. 1 will then be described. FIG. 7A is a flowchart of the interface configuration change request message receiving process of the first embodiment. As shown FIG. 7A, the interface configuration change processing unit 101b refers to the "destination IP address" of the received interface configuration change request message to determine whether the message is addressed to the own apparatus (step S201). If it is determined that the message is addressed to the own apparatus (step S201, Yes), the procedure goes to step S202, and if it is determined that the message is not addressed to the own apparatus (step S201, No), step S201 is repeated:

The interface configuration change processing unit 101b executes the control channel information update process (at the time of reception of the interface configuration change request message) based on the received interface configuration change request message (step S202). Details of the control channel information update process (at the time of reception of the interface configuration change request message) will be described later with reference to FIG. 7B.

The interface configuration change processing unit 101b executes the interface information update process of updating the interface information entered in the interface information table 102b based on the received interface configuration change request message (step S203). After this process is completed, the interface configuration change request message receiving process is terminated.

Information of adjacent nodes (combinations of IP addresses and apparatus IDs) before update or erasing may be retained as control information before update in a predetermined storage area for each control channel. When the interface configuration change must be restored for some reason, this eliminates the need to collect the IP link information, the control channel information, and the interface information from scratch with the adjacent node detection processing unit 101c and the restoration may quickly be performed.

Figure 7B:
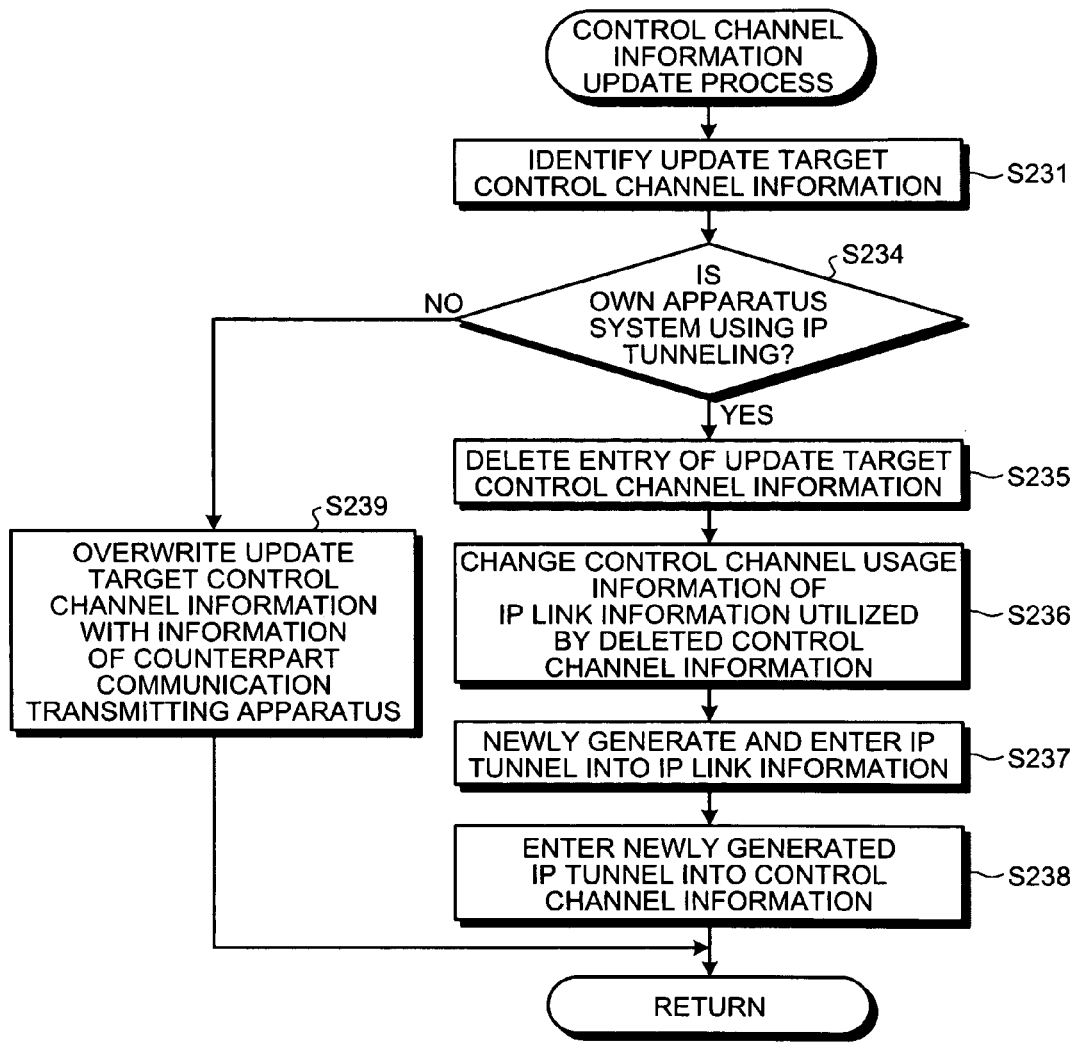
FIG. 7B is a flowchart of the control channel information update process (at the time of reception of the interface configuration change request message) procedure of the first embodiment.

The control channel information update process (at the time of reception of the interface configuration change request message) executed at step S202 of FIG. 7A will then be described. FIG. 7B is a flowchart of the control channel information update process (at the time of reception of the interface configuration change request message) procedure of the first embodiment. The interface configuration change processing unit 101b identifies the control channel information to be updated based on the received interface configuration change request message (step S231).

The interface configuration change processing unit 101b then determines whether the own apparatus is a system using the IP tunneling (step S234). If it is determined that the own apparatus is a system using the IP tunneling (step S234, Yes), the procedure goes to step S235, and if it is determined that the own apparatus is not a system using the IP tunneling (step S234, No), the procedure goes to step S239.

At step S235, the interface configuration change processing unit 101b deletes the entry of the control channel information to be updated from the control channel information table 103a. The interface configuration change processing unit 101b then changes the control channel usage information to "not use" for the IP link information utilized by the control channel information deleted at step S235 (steps S236).

The interface configuration change processing unit 101b newly generates and enters an IP tunnel into the IP link information of the IP link information table 102a (step S237). Specifically, an IP tunnel with a remote end "IP3", a local end "IP1", and a tunnel internal IP address "IP3" is newly generated with the use of GRE (General Routing Encapsulation) thought the IP link with the "identifier" of "1" having the control channel usage information changed to "not use" at step S236.

An IP address having the "identifier" of "2" in the IP link information is used for the output destination of a packet addressed to "IP3". An IP address having the "identifier" of "2" in the control channel information is registered through the entry having the "identifier" of "2" in the IP link information. The "counterpart communication transmitting apparatus IP address" and the "counterpart communication transmitting apparatus ID" are used as values included in the interface configuration change request message.

The interface configuration change processing unit 101b enters the IP tunnel newly generated at step S237 into the control channel information of the control channel information table 103a (step S238). Specifically, the IP tunnel is entered for the "identifier" of "2". After this process is completed, the procedure returns to step S203 of FIG. 7A.

On the other hand, at step S239, the interface configuration change processing unit 101b overwrites the update target control channel information with the information (IP address and apparatus ID) of the counterpart communication transmitting apparatus. After this process is completed, the procedure returns to step S203 of FIG. 7A.

Information of adjacent nodes (combinations of IP addresses and apparatus IDs) before update or erasing may be retained as control information before update in a predetermined storage area for each control channel. When the interface configuration change must be restored for some reason, this eliminates the need to collect the IP link information, the control channel information, and the interface information from scratch with the adjacent node detection processing unit 101c and the restoration may quickly be performed.

Figure 8A:
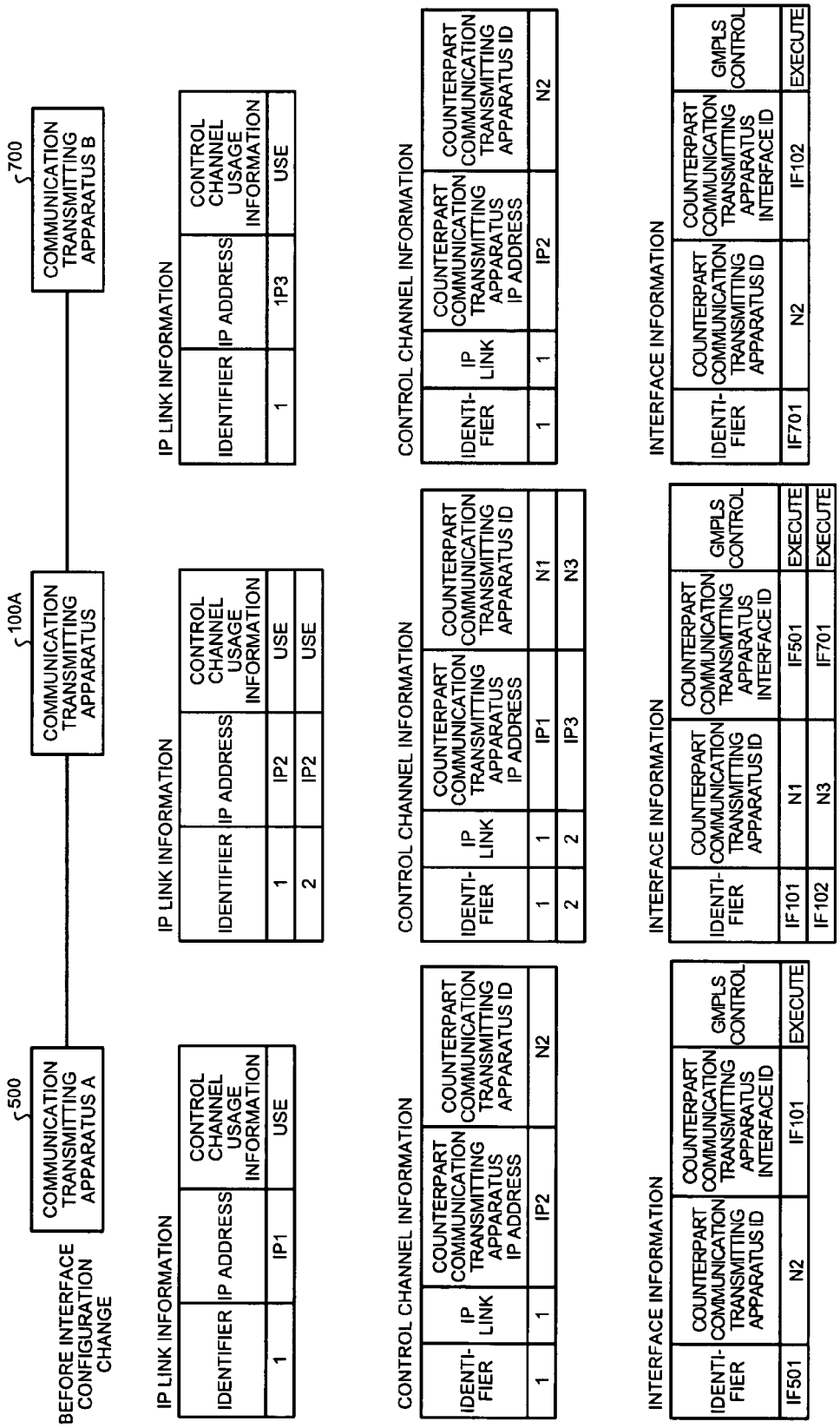
FIG. 8A depicts stored values of various tables before the interface configuration change of the first embodiment.

Changes in the IP link information, the control channel information, and the interface information due to the interface configuration change of the first embodiment will then be described with reference to FIGS. 8A, 8B, and 8C. FIG. 8A depicts the IP link information, the control channel information, and the interface information of the communication transmitting apparatus A 500, the communication transmitting apparatus 100A, and the communication transmitting apparatus B 700 before the interface configuration change of the first embodiment.

In FIG. 8A, the IP link information, the control channel information, and the interface information before the interface configuration change of the first embodiment are as follows. The IP link information of the communication transmitting apparatus A 500 includes an entry having the "identifier" of "1", the "IP address" of "IP1", and the "control channel usage information" of "use". The control channel information of the communication transmitting apparatus A 500 includes an entry having the "identifier" of "1", the "IP link" of "1", the "counterpart communication transmitting apparatus IP address" of "IP2", and the "counterpart communication transmitting apparatus ID" of "N2". The interface information of the communication transmitting apparatus A 500 includes an entry having the "identifier" of "IF501", the "counterpart communication transmitting apparatus ID" of "N2", the "counterpart communication transmitting apparatus interface ID" of "IF101", and the "GMPLS control" of "execute".

The IP link information of the communication transmitting apparatus 100A includes an entry having the "identifier" of "1", the "IP address" of "IP2", and the "control channel usage information" of "use" and an entry having the "identifier" of "2", the "IP address" of "IP2", and the "control channel usage information" of "use". The control channel information of the communication transmitting apparatus 100A includes an entry having the "identifier" of "1", the "IP link" of "1", the "counterpart communication transmitting apparatus IP address" of "IP1", and the "counterpart communication transmitting apparatus ID" of "N1" and an entry having the "identifier" of "2", the "IP link" of "2", the "counterpart communication transmitting apparatus IP address" of "IP3", and the "counterpart communication transmitting apparatus ID" of "N3". The interface information of the communication transmitting apparatus 100A includes an entry having the "identifier" of "IF101", the "counterpart communication transmitting apparatus ID" of "N1", the "counterpart communication transmitting apparatus interface ID" of "IF501", and the "GMPLS control" of "execute" and an entry having the "identifier" of "IF102", the "counterpart communication transmitting apparatus ID" of "N3", the "counterpart communication transmitting apparatus interface ID" of "IF701", and the "GMPLS control" of "execute".

The IP link information of the communication transmitting apparatus B 700 includes an entry having the "identifier" of "1", the "IP address" of "IP3", and the "control channel usage information" of "use". The control channel information of the communication transmitting apparatus B 700 includes an entry having the "identifier" of "1", the "IP link" of "1", the "counterpart communication transmitting apparatus IP address" of "IP2", and the "counterpart communication transmitting apparatus ID" of "N2". The interface information of the communication transmitting apparatus B 700 includes an entry having the "identifier" of "IF701", the "counterpart communication transmitting apparatus ID" of "N2", the "counterpart communication transmitting apparatus interface ID" of "IF102", and the "GMPLS control" of "execute".

Figure 8B:
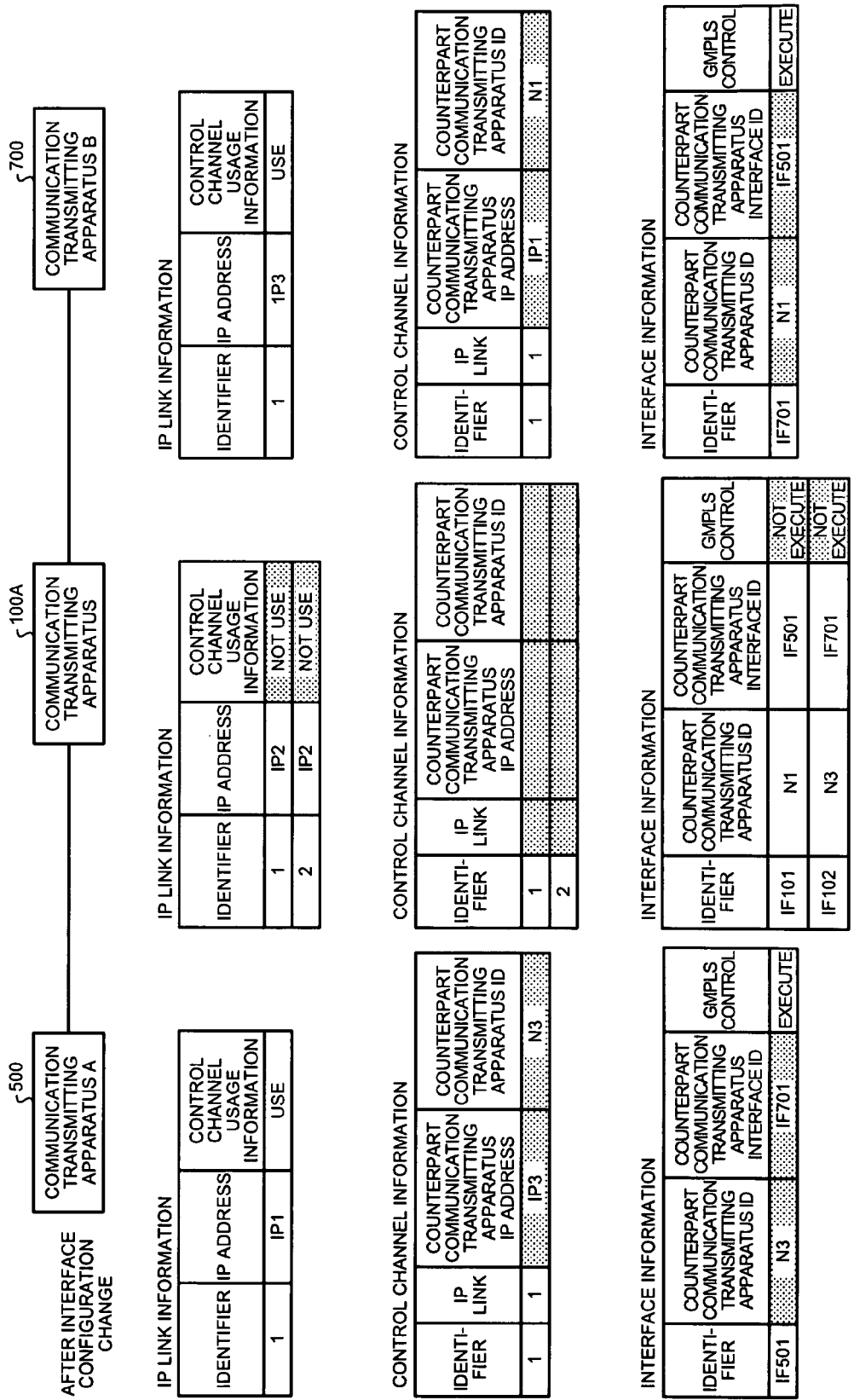
FIG. 8B depicts changes in the stored values of various tables after the interface configuration change of the first embodiment (in the case of a system not using the IP tunnel)

FIG. 8B depicts the IP link information, the control channel information, and the interface information of the communication transmitting apparatus A 500, the communication transmitting apparatus 100A, and the communication transmitting apparatus B 700 after the interface configuration change of the first embodiment (in the case of a system not using the IP tunnel). The IP link information of the communication transmitting apparatus A 500 includes an entry having the "identifier" of "1", the "IP address" of "IP1", and the "control channel usage information" of "use" and is not changed before and after the interface configuration change.

However, the control channel information of the communication transmitting apparatus A 500 includes the entry having the "identifier" of "1" and the "IP link" of "1", which are not changed, and the "counterpart communication transmitting apparatus IP address" changed to "IP3", and the "counterpart communication transmitting apparatus ID" changed to "N3". This change is a result of the process at step S239 of FIG. 7B.

The interface information of the communication transmitting apparatus A 500 includes the entry having the "identifier" of "IF501" and the "GMPLS control" of "execute", which are not changed, and the "counterpart communication transmitting apparatus ID" changed to "N3", and the "counterpart communication transmitting apparatus interface ID" changed to "IF701". This change is a result of the process at step S203 of FIG. 7A.

In the IP link information of the communication transmitting apparatus 100A, although the entries having the "identifiers" of "1" and "2" are not changed in the "IP address" of "IP2", the "control channel usage information" is changed to "not use" in the both entries. This change is a result of the process at step S153 of FIG. 6C.

In the control channel information of the communication transmitting apparatus 100A, the stored values are deleted in the "IP link", the "counterpart communication transmitting apparatus IP address", and the "counterpart communication transmitting apparatus ID" of the both entries having the "identifiers" of "1" and "2". This change is a result of the process at step S152 of FIG. 6C.

In the interface information of the communication transmitting apparatus 100A, the "GMPLS control" is changed to "not execute" in all the entries. This change is a result of the process at step S107 of FIG. 6A.

The IP link information of the communication transmitting apparatus B 700 includes the entry having the "identifier" of "1", the "IP address" of "IP3", and the "control channel usage information" of "use" and is not changed before and after the interface configuration change.

However, the control channel information of the communication transmitting apparatus B 700 includes the entry having the "identifier" of "1" and the "IP link" of "1", which are not changed, and the "counterpart communication transmitting apparatus IP address" changed to "IP1", and the "counterpart communication transmitting apparatus ID" changed to "N1". This change is a result of the process at step S239 of FIG. 7B.

The interface information of the communication transmitting apparatus B 700 includes the entry having the "identifier" of "IF701" and the "GMPLS control" of "execute", which are not changed, and the "counterpart communication transmitting apparatus ID" changed to "N1", and the "counterpart communication transmitting apparatus interface ID" changed to "IF501". This change is a result of the process at step S203 of FIG. 7A.

Figure 8C:
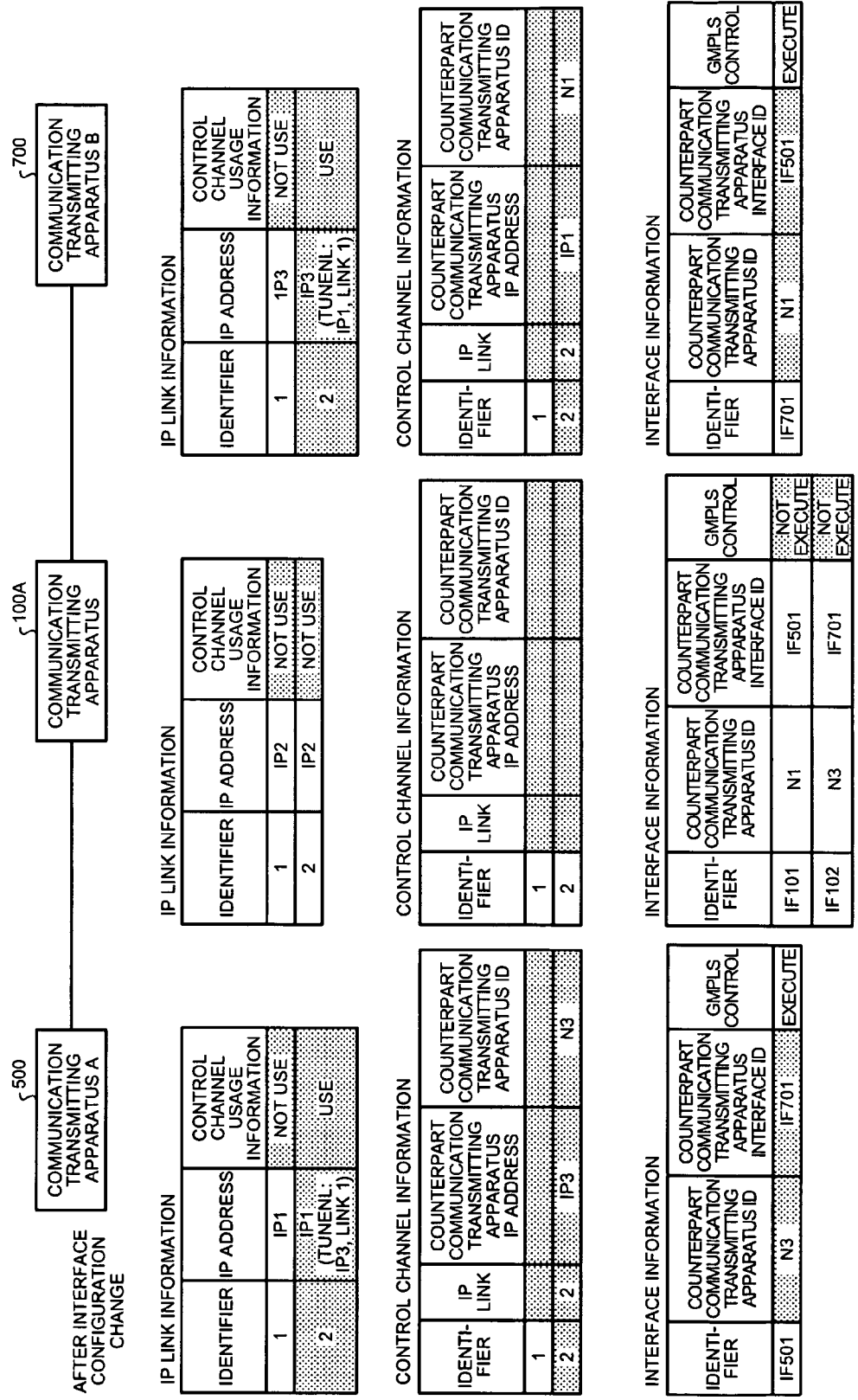
FIG. 8C depicts changes in the stored values of various tables after the interface configuration change of the first embodiment (in the case of a system using the IP tunnel)

FIG. 8C depicts the IP link information, the control channel information, and the interface information of the communication transmitting apparatus A 500, the communication transmitting apparatus 100A, and the communication transmitting apparatus B 700 after the interface configuration change of the first embodiment (in the case of a system using the IP tunnel). In the IP link information of the communication transmitting apparatus A 500, the "control channel usage information" is changed to "not use" in the entry having the "identifier" of "1" and the "IP address" of "IP1". This change is a result of the process at step S236 of FIG. 7B. An entry is newly added that has the "identifier" of "2", the "IP address" of "IP1 (tunnel: IP3, link 1)", and the "control channel usage information" of "use". This change is a result of the process at step S237 of FIG. 7B.

In the control channel information of the communication transmitting apparatus A 500, the stored values are deleted in the "IP link", the "counterpart communication transmitting apparatus IP address", and the "counterpart communication transmitting apparatus ID" of the entry having the "identifier" of "1", and an entry is newly added that has the "identifier" of "2", the "IP link" of "2", the "counterpart communication transmitting apparatus IP address" of "IP3", and the "counterpart communication transmitting apparatus ID" of "N3". This change is a result of the process at steps S235 and S238 of FIG. 7B.

The interface information of the communication transmitting apparatus A 500 includes the entry having the "identifier" of "IF501" and the "GMPLS control" of "execute", which are not changed, and the "counterpart communication transmitting apparatus ID" changed to "N3", and the "counterpart communication transmitting apparatus interface ID" changed to "IF701". This change is a result of the process at step S203 of FIG. 7A.

After the interface configuration change of the first embodiment (in the case of a system using the IP tunnel), the IP link information, the control information, and the interface information of the communication transmitting apparatus 100A are the same as those after the interface configuration change of the first embodiment (in the case of a system not using the IP tunnel).

In the control channel information of the communication transmitting apparatus 100A, the stored values are deleted in the "IP link", the "counterpart communication transmitting apparatus IP address", and the "counterpart communication transmitting apparatus ID" of the both entries having the "identifiers" of "1" and "2". This change is a result of the process at step S153 of FIG. 6C.

In the interface information of the communication transmitting apparatus 100A, the stored values are not changed in the entry having the "identifier" of "IF101", the "counterpart communication transmitting apparatus ID" of "N1", the "counterpart communication transmitting apparatus interface ID" of "IF501" and the entry having the "identifier" of "IF102", the "counterpart communication transmitting apparatus ID" of "N3", the "counterpart communication transmitting apparatus interface ID" of "IF701", except that the "GMPLS control" is changed to "not execute" in the both entries. This change is a result of the process at step S107 of FIG. 6A.

In the IP link information of the communication transmitting apparatus B 700, the "control channel usage information" is changed to "not use" in the entry having the "identifier" of "1" and the "IP address" of "IP3". This change is a result of the process at step S236 of FIG. 7B. An entry is newly added that has the "identifier" of "2", the "IP address" of "IP3 (tunnel: IP1, link 1)", and the "control channel usage information" of "use". This change is a result of the process at step S237 of FIG. 7B.

In the control channel information of the communication transmitting apparatus B 700, the stored values are deleted in the "IP link", the "counterpart communication transmitting apparatus IP address", and the "counterpart communication transmitting apparatus ID" of the entry having the "identifier" of "1", and an entry is newly added that has the "identifier" of "2", the "IP link" of "2", the "counterpart communication transmitting apparatus IP address" of "IP1", and the "counterpart communication transmitting apparatus ID" of "N1". This change is a result of the process at steps S235 and S238 of FIG. 7B.

The interface information of the communication transmitting apparatus B 700 includes the entry having the "identifier" of "IF701" and the "GMPLS control" of "execute", which are not changed, and the "counterpart communication transmitting apparatus ID" changed to "N1", and the "counterpart communication transmitting apparatus interface ID" changed to "IF501". This change is a result of the process at step S203 of FIG. 7A.

Figure 9:
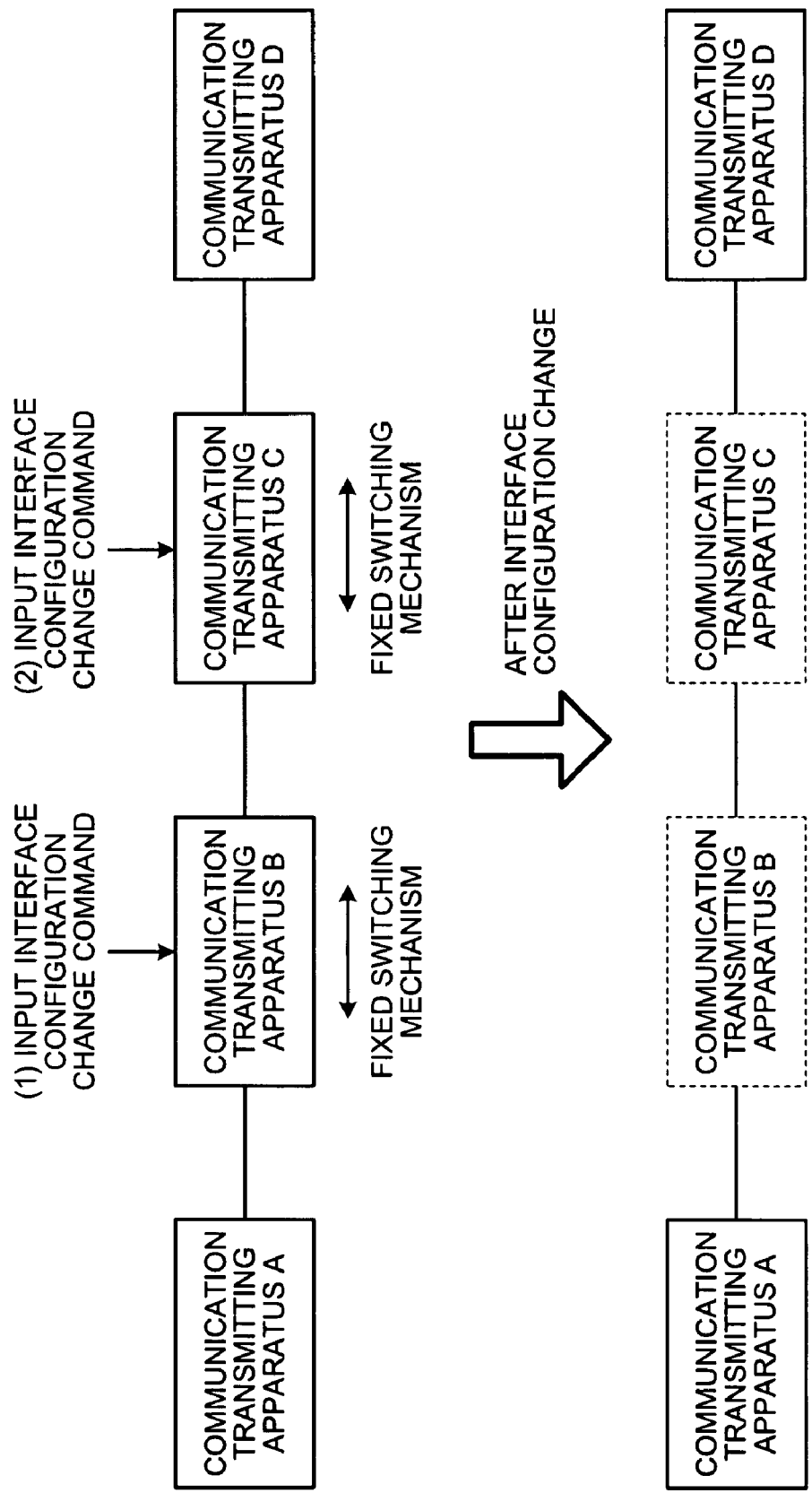
FIG. 9 depicts an outline of causing a plurality of adjacent communication transmitting apparatuses to be passed through to change the interface configuration in an application of the first embodiment.

If a plurality of the communication transmitting apparatuses 100A (a communication transmitting apparatus B and a communication transmitting apparatus C) of the first embodiment between the opposed communication transmitting apparatuses (a communication transmitting apparatus A and a communication transmitting apparatus D) as shown in FIG. 9, the communication transmitting apparatus B and the communication transmitting apparatus C may virtually be passed through by sequentially input the interface configuration change command to the communication transmitting apparatus B and the communication transmitting apparatus C to logically directly connect the respective interfaces of the communication transmitting apparatus A and the communication transmitting apparatus D.

Although the interface configuration change processing unit 101b is triggered to perform a series of the interface configuration changes by receiving the interface configuration change command with the input command processing unit 101a in the first embodiment, this is not a limitation, and the interface configuration change processing unit 101b may periodically refer to the switching information table 102c to automatically performs a series of the interface configuration changes when a combination of fixed-switching interfaces is found.

Second Embodiment

A second embodiment will hereinafter be described with reference to FIGS. 10 to 15C. It is assumed in the second embodiment that three communication transmitting apparatuses are connected through two optical fibers for each apparatus and that a communication transmitting apparatus 100B relays optical signals between two opposed communication transmitting apparatuses. It is assumed that the communication transmitting apparatus 100B performs the fixed switching in both of two transmission paths for the two opposed communication transmitting apparatuses. The second embodiment will be described only for differences from the first embodiment.

Figure 10:
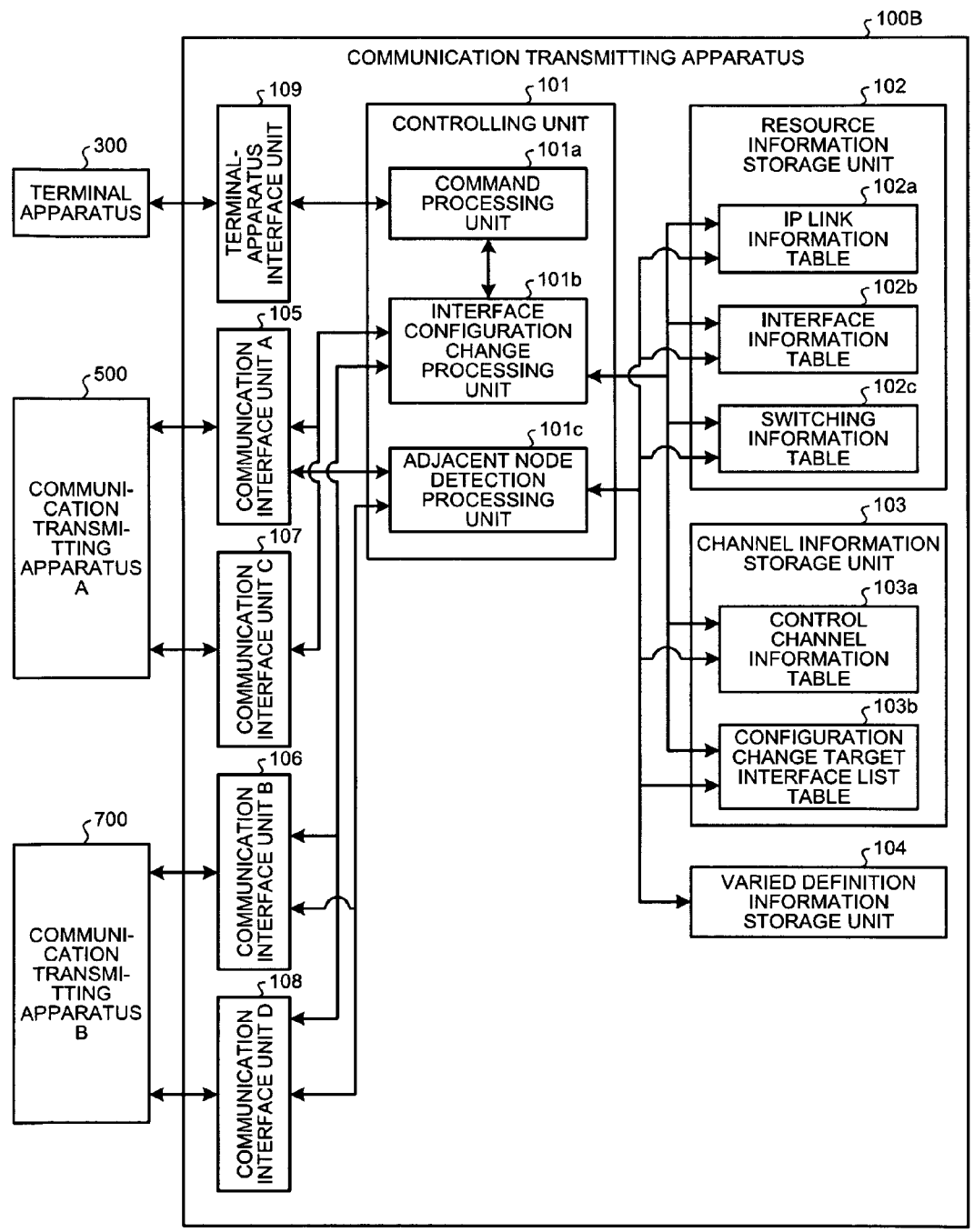
FIG. 10 is a functional block diagram of the configuration of the communication transmitting apparatus according to a second embodiment.

A configuration of the communication transmitting apparatus 100B will first be described. FIG. 10 is a functional block diagram of the configuration of the communication transmitting apparatus 100B according to the second embodiment. As shown in FIG. 10, the communication transmitting apparatus 100B according to the second embodiment includes the configuration of the communication transmitting apparatus 100A according to the first embodiment with a communication interface unit C 107 and the communication interface unit D 108 added thereto. The entry contents are correspondingly varied in the interface information table 102b, the switching information table 102c, and the configuration change target interface list table 103b. However, since other constituent elements are the same as the communication transmitting apparatus 100A, only differences will be described. A standard communication function of the communication transmitting apparatus 100B is not shown in FIG. 10.

The communication transmitting apparatus 100B is connected through the communication interface unit A 105 and the communication interface unit C 107 to the communication transmitting apparatus A 500 with two optical fibers and connected through the communication interface unit B 106 and the communication interface unit D 108 to the communication transmitting apparatus B 700 with two optical fibers. The communication transmitting apparatus A 500 and the communication transmitting apparatus B 700 have the same configuration as the communication transmitting apparatus 100B in the second embodiment.

In the second embodiment, the "interface ID" of the communication interface unit C 107 is "IF103" and the "interface ID" of the communication interface unit D 108 is "IF104".

From FIG. 11A, referring to the interface information table 102b according to the second embodiment, it can be seen that a connection is made to a counterpart communication transmitting apparatus having the "counterpart communication transmitting apparatus ID" of "N1" stored in the entry with the "identifier" of "IF101" through the "counterpart communication transmitting apparatus interface ID" of "IF501" of the counterpart communication transmitting apparatus, and that the "GMPLS control" is utilized. It can also be known that a connection is made to a counterpart communication transmitting apparatus having the "counterpart communication transmitting apparatus ID" of "N3" stored in the entry with the "identifier" of "IF102" through the "counterpart communication transmitting apparatus interface ID" of "IF701" of the counterpart communication transmitting apparatus, and the "GMPLS control" is utilized.

It can also be known that a connection is made to a counterpart communication transmitting apparatus having the "counterpart communication transmitting apparatus ID" of "N1" stored in the entry with the "identifier" of "IF103" through the "counterpart communication transmitting apparatus interface ID" of "IF502" of the counterpart communication transmitting apparatus, and that the "GMPLS control" is utilized. It can also be known that a connection is made to a counterpart communication transmitting apparatus having the "counterpart communication transmitting apparatus ID" of "N3" stored in the entry with the "identifier" of "IF104" through the "counterpart communication transmitting apparatus interface ID" of "IF702" of the counterpart communication transmitting apparatus, and that the "GMPLS control" is utilized.

From FIG. 11B, referring to the switching information table 102c according to the second embodiment, it can be seen that the communication interface unit A 105 of "IF101" has channels of resources from 1 CH to 48 CH and performs the switching every 48 CH, that the communication interface unit B 106 of "IF102" has channels of resources from 1 CH to 48 CH and performs the switching every 48 CH, that the communication interface unit C 107 of "IF103" has channels from 1 CH to 48 CH and performs the switching every 48 CH, and that the communication interface unit D 108 of "IF104" has channels of resources from 1 CH to 48 CH and performs the switching every 48 CH.

It can also be seen that all the channels of "IF101" are straight-connected to channels of "IF102" having the same numbers, that all the channels of "IF103" are straight-connected to channels of "IF104" having the same numbers, and that the both connections are "fixed switch mechanisms".

From FIG. 12, referring to the configuration change target interface list table 103b according to the second embodiment, it can be seen that the communication transmitting apparatus 100B may logically be passed through and may be excluded from the operation of GMPLS by directly linking the interfaces with the "interface ID" of "IF101" and "IF102" (i.e., the communication interface unit A 105 and the communication interface unit B 106). It can also be seen that the communication transmitting apparatus 100B may logically be passed through and may be excluded from the operation of GMPLS by directly linking the interfaces with the "interface ID" of "IF103" and "IF104" (i.e., the communication interface unit C 107 and the communication interface unit D 108).

A format of the interface configuration change request message according to the second embodiment includes fields of "destination IP address", "source IP address", "source apparatus ID", "changed IP address", "changed apparatus ID", "first change target communication transmitting apparatus ID", "first change target communication transmitting apparatus interface ID", "second change target communication transmitting apparatus ID", "second change target communication transmitting apparatus interface ID", "first changed communication transmitting apparatus ID", "first changed communication transmitting apparatus interface ID", "second changed communication transmitting apparatus ID", and "second changed communication transmitting apparatus interface ID" as shown in an example of FIG. 13.

The "first change target communication transmitting apparatus ID" is an apparatus ID of a communication transmitting apparatus to be changed, which is included in the interface information of a first communication transmitting apparatus requested to change the interface configuration. The "first change target communication transmitting apparatus interface ID" is an interface ID of a communication transmitting apparatus to be changed, which is included in the interface information of the communication transmitting apparatus requested to change the interface configuration. The first communication transmitting apparatus is the communication transmitting apparatus A 500 in the second embodiment.

Similarly, the "second change target communication transmitting apparatus ID" is an apparatus ID of a communication transmitting apparatus to be changed, which is included in the interface information of a second communication transmitting apparatus requested to change the interface configuration. The "second change target communication transmitting apparatus interface ID" is an interface ID of a communication transmitting apparatus to be changed, which is included in the interface information of the second communication transmitting apparatus requested to change the interface configuration. The second communication transmitting apparatus is the communication transmitting apparatus B 700 in the second embodiment.

The "first changed communication transmitting apparatus ID" is an apparatus ID of a changed communication transmitting apparatus included in the interface information of the first communication transmitting apparatus requested to change the interface configuration. The "first changed communication transmitting apparatus interface ID" is an interface ID of a changed communication transmitting apparatus included in the interface information of the first communication transmitting apparatus requested to change the interface configuration.

Similarly, the "second changed communication transmitting apparatus ID" is an apparatus ID of a changed communication transmitting apparatus included in the interface information of the second communication transmitting apparatus requested to change the interface configuration. The "second changed communication transmitting apparatus interface ID" is an interface ID of a changed communication transmitting apparatus included in the interface information of the second communication transmitting apparatus requested to change the interface configuration.

The above format of the interface configuration change request message according to the second embodiment includes the fields of, for example, 32-bit length and may be a variable TLV (Type Length Value) format such as those used in RSVP (Resource reSerVation Protocol) and OSPF (Open Shortest Path First). The fields may be arranged in any orders. The fields may suitably be combined as needed.

The interface configuration change request message process according to the second embodiment will then be described. The processes other than the interface configuration change request message process are the same as the first embodiment and will not be described. The interface configuration change request message of the second embodiment is also executed at step S105 of FIG. 6A. FIG. 14 is a flowchart of the interface configuration change request message process procedure of the second embodiment.

The interface configuration change processing unit 101b first refers to the configuration change target interface list table 103b according to the second embodiment to check entries having the same opposed apparatus (step S131).

The interface configuration change processing unit 101b refers to the configuration change target interface list table 103b according to the second embodiment to store the "destination IP address", the "source IP address", the "source apparatus ID", the "changed IP address", and the "changed apparatus ID" into respective fields of the interface configuration change request message (step S132).

The interface configuration change processing unit 101b then refers to the configuration change target interface list table 103b according to the second embodiment to store the "first change target communication transmitting apparatus ID", the "first change target communication transmitting apparatus interface ID", the "second change target communication transmitting apparatus ID", the "second change target communication transmitting apparatus interface ID", the "first changed communication transmitting apparatus ID", the "first changed communication transmitting apparatus interface ID", the "second changed communication transmitting apparatus ID", and the "second changed communication transmitting apparatus interface ID" into respective fields of the interface configuration change request message (step S133).

The interface configuration change processing unit 101b then refers to the configuration change target interface list table 103b according to the second embodiment to determine whether an entry for the same opposed apparatus exists (step S134). If it is determined that an entry exists for the same opposed apparatus (step S134, Yes), the procedure goes to step S133, and if it is determined that no entry exists for the same opposed apparatus (step S134, No), the procedure goes to step S136.

At step S136, the interface configuration change processing unit 101b transmits the interface configuration change request message generated in the above process to a destination counterpart communication transmitting apparatus. After this process is completed, the procedure returns to step S106 of FIG. 6A.

Changes in the IP link information, the control channel information, and the interface information due to the interface configuration change of the second embodiment will then be described with reference to FIGS. 15A, 15B, and 15C. FIG. 15A depicts the IP link information, the control channel information, and the interface information of the communication transmitting apparatus A 500, the communication transmitting apparatus 100A, and the communication transmitting apparatus B 700 before the interface configuration change of the second embodiment.

In FIG. 15A, the IP link information, the control channel information, and the interface information before the interface configuration change of the second embodiment are as follows. The IP link information of the communication transmitting apparatus A 500 includes an entry having the "identifier" of "1", the "IP address" of "IP1", and the "control channel usage information" of "use". The control channel information of the communication transmitting apparatus A 500 includes an entry having the "identifier" of "1", the "IP link" of "1", the "counterpart communication transmitting apparatus IP address" of "IP2", and the "counterpart communication transmitting apparatus ID" of "N2".

The interface information of the communication transmitting apparatus A 500 includes an entry having the "identifier" of "IF501", the "counterpart communication transmitting apparatus ID" of "N2", the "counterpart communication transmitting apparatus interface ID" of "IF101", and the "GMPLS control" of "execute" and an entry having the "identifier" of "IF502", the "counterpart communication transmitting apparatus ID" of "N2", the "counterpart communication transmitting apparatus interface ID" of "IF103", and the "GMPLS control" of "execute".

The IP link information of the communication transmitting apparatus 100B includes an entry having the "identifier" of "1", the "IP address" of "IP2", and the "control channel usage information" of "use" and an entry having the "identifier" of "2", the "IP address" of "IP2", and the "control channel usage information" of "use".

The control channel information of the communication transmitting apparatus 100B includes an entry having the "identifier" of "1", the "IP link" of "1", the "counterpart communication transmitting apparatus IP address" of "IP1", and the "counterpart communication transmitting apparatus ID" of "N1" and an entry having the "identifier" of "2", the "IP link" of "2", the "counterpart communication transmitting apparatus IP address" of "IP3", and the "counterpart communication transmitting apparatus ID" of "N3".

The interface information of the communication transmitting apparatus 100B includes an entry having the "identifier" of "IF101", the "counterpart communication transmitting apparatus ID" of "N1", the "counterpart communication transmitting apparatus interface ID" of "IF501", and the "GMPLS control" of "execute", an entry having the "identifier" of "IF102", the "counterpart communication transmitting apparatus ID" of "N3", the "counterpart communication transmitting apparatus interface ID" of "IF701", and the "GMPLS control" of "execute", an entry having the "identifier" of "IF103", the "counterpart communication transmitting apparatus ID" of "N1", the "counterpart communication transmitting apparatus interface ID" of "IF502", and the "GMPLS control" of "execute", and an entry having the "identifier" of "IF104", the "counterpart communication transmitting apparatus ID" of "N3", the "counterpart communication transmitting apparatus interface ID" of "IF702", and the "GMPLS control" of "execute".

The IP link information of the communication transmitting apparatus B 700 includes an entry having the "identifier" of "1", the "IP address" of "IP3", and the "control channel usage information" of "use". The control channel information of the communication transmitting apparatus B 700 includes an entry having the "identifier" of "1", the "IP link" of "1", the "counterpart communication transmitting apparatus IP address" of "IP2", and the "counterpart communication transmitting apparatus ID" of "N2". The interface information of the communication transmitting apparatus B 700 includes an entry having the "identifier" of "IF701", the "counterpart communication transmitting apparatus ID" of "N2", the "counterpart communication transmitting apparatus interface ID" of "IF102", and the "GMPLS control" of "execute" and an entry having the "identifier" of "IF702", the "counterpart communication transmitting apparatus ID" of "N2", the "counterpart communication transmitting apparatus interface ID" of "IF104", and the "GMPLS control" of "execute".

FIG. 15B depicts the IP link information, the control channel information, and the interface information of the communication transmitting apparatus A 500, the communication transmitting apparatus 100B, and the communication transmitting apparatus B 700 after the interface configuration change of the second embodiment (in the case of a system not using the IP tunnel). The IP link information of the communication transmitting apparatus A 500 includes an entry having the "identifier" of "1", the "IP address" of "IP1", and the "control channel usage information" of "use" and is not changed before and after the interface configuration change.

However, the control channel information of the communication transmitting apparatus A 500 includes the entry having the "identifier" of "1" and the "IP link" of "1", which are not changed, and the "counterpart communication transmitting apparatus IP address" changed to "IP3", and the "counterpart communication transmitting apparatus ID" changed to "N3". This change is a result of the process at step S239 of FIG. 7B.

Although the interface information of the communication transmitting apparatus A 500 is not changed in the "identifier" of "IF501", the "GMPLS control" of "execute", the "identifier" of "IF502", and the "GMPLS control" of "execute", the "counterpart communication transmitting apparatus ID" is changed to "N3" in the both entries, and the "counterpart communication transmitting apparatus interface ID" is changed to "IF701" in the entry having the "identifier" of "IF501" and to "IF702" in the entry having the "identifier" of "IF502". This change is a result of the process at step S203 of FIG. 7A.

In the IP link information of the communication transmitting apparatus 100B, although the entries having the "identifiers" of "1" and "2" are not changed in the "IP address" of "IP2", the "control channel usage information" is changed to "not use" in the both entries. This change is a result of the process at step S153 of FIG. 6C.

In the control channel information of the communication transmitting apparatus 100B, the stored values are deleted in the "IP link", the "counterpart communication transmitting apparatus IP address", and the "counterpart communication transmitting apparatus ID" of the both entries having the "identifiers" of "1" and "2". This change is a result of the process at step S152 of FIG. 6C.

In the interface information of the communication transmitting apparatus 100B, the "GMPLS control" is changed to "not execute" in all the entries. This change is a result of the process at step S107 of FIG. 6A.

The IP link information of the communication transmitting apparatus B 700 includes the entry having the "identifier" of "1", the "IP address" of "IP3", and the "control channel usage information" of "use" and is not changed before and after the interface configuration change.

However, the control channel information of the communication transmitting apparatus B 700 includes the entry having the "identifier" of "1" and the "IP link" of "1", which are not changed, and the "counterpart communication transmitting apparatus IP address" changed to "IP1", and the "counterpart communication transmitting apparatus ID" changed to "N1". This change is a result of the process at step S239 of FIG. 7B.

In the interface information of the communication transmitting apparatus B 700, the entry having the "identifier" of "IF701" and the "GMPLS control" of "execute" has the "counterpart communication transmitting apparatus ID" changed to "N1" and the "counterpart communication transmitting apparatus interface ID" changed to "IF501", and the entry having the "identifier" of "IF702" and the "GMPLS control" of "execute" has the "counterpart communication transmitting apparatus ID" changed to "N1" and the "counterpart communication transmitting apparatus interface ID" changed to "IF502". This change is a result of the process at step S203 of FIG. 7A.

FIG. 15C depicts the IP link information, the control channel information, and the interface information of the communication transmitting apparatus A 500, the communication transmitting apparatus 100B, and the communication transmitting apparatus B 700 after the interface configuration change of the second embodiment (in the case of a system using the IP tunnel). In the IP link information of the communication transmitting apparatus A 500, the "control channel usage information" is changed to "not use" in the entry having the "identifier" of "1" and the "IP address" of "IP1". This change is a result of the process at step S236 of FIG. 7B. An entry is newly added that has the "identifier" of "2", the "IP address" of "IP1 (tunnel: IP3, link 1)", and the "control channel usage information" of "use". This change is a result of the process at step S237 of FIG. 7B.

In the control channel information of the communication transmitting apparatus A 500, the stored values are deleted in the "IP link", the "counterpart communication transmitting apparatus IP address", and the "counterpart communication transmitting apparatus ID" of the entry having the "identifier" of "1", and an entry is newly added that has the "identifier" of "2", the "IP link" of "2", the "counterpart communication transmitting apparatus IP address" of "IP3", and the "counterpart communication transmitting apparatus ID" of "N3". This change is a result of the process at steps S235 and S238 of FIG. 7B.

After the interface configuration change of the second embodiment (in the case of a system using the IP tunnel), the IP link information, the control information, and the interface information of the communication transmitting apparatus 100B are the same as those after the interface configuration change of the second embodiment (in the case of a system not using the IP tunnel).

In the IP link information of the communication transmitting apparatus B 700, the "control channel usage information" is changed to "not use" in the entry having the "identifier" of "1" and the "IP address" of "IP3". This change is a result of the process at step S236 of FIG. 7B. An entry is newly added that has the "identifier" of "2", the "IP address" of "IP3 (tunnel: IP1, link 1)", and the "control channel usage information" of "use". This change is a result of the process at step S237 of FIG. 7B.

In the control channel information of the communication transmitting apparatus B 700, the stored values are deleted in the "IP link", the "counterpart communication transmitting apparatus IP address", and the "counterpart communication transmitting apparatus ID" of the entry having the "identifier" of "1", and an entry is newly added that has the "identifier" of "2", the "IP link" of "2", the "counterpart communication transmitting apparatus IP address" of "IP1", and the "counterpart communication transmitting apparatus ID" of "N1". This change is a result of the process at steps S235 and S238 of FIG. 7B.

In the interface information of the communication transmitting apparatus B 700, the entry having the "identifier" of "IF701" and the "GMPLS control" of "execute" has the "counterpart communication transmitting apparatus ID" and the "counterpart communication transmitting apparatus interface ID" changed to "N1" and "IF501", respectively, and the entry having the "identifier" of "IF702" and the "GMPLS control" of "execute" has the "counterpart communication transmitting apparatus ID" and the "counterpart communication transmitting apparatus interface ID" changed to "N1" and "IF502", respectively. This change is a result of the process at step S203 of FIG. 7A.

Although the second embodiment has been described, if three communication transmitting apparatuses are connected through N (N≧3) optical fibers for each apparatus and two opposed communication apparatuses have N transmission paths, the second embodiment is applicable when the same configuration and process as the communication transmitting apparatus 100B are achieved. In this case, the "change target communication transmitting apparatus ID", the "change target communication transmitting apparatus interface ID", the "changed communication transmitting apparatus ID", and the "changed communication transmitting apparatus interface ID" of the interface configuration change request message according to the second embodiment have N-times repeated configurations.

Third Embodiment

A third embodiment will hereinafter be described with reference to FIGS. 16 to 25C. It is assumed in the third embodiment that three communication transmitting apparatuses are connected through two optical fibers for each apparatus and that a communication transmitting apparatus 100C relays optical signals between two opposed communication transmitting apparatuses. It is assumed that the communication transmitting apparatus 100C according to the third embodiment performs the fixed switching in only one transmission path of the two opposed communication transmitting apparatuses and does not perform the fixed switching in the other transmission path. The communication transmitting apparatus 100C according to the third embodiment has the same configuration as the communication transmitting apparatus 100B according to the second embodiment. A process executed by the communication transmitting apparatus 100C will be described only for differences from the communication transmitting apparatus 100B.

Figures 16, 17:
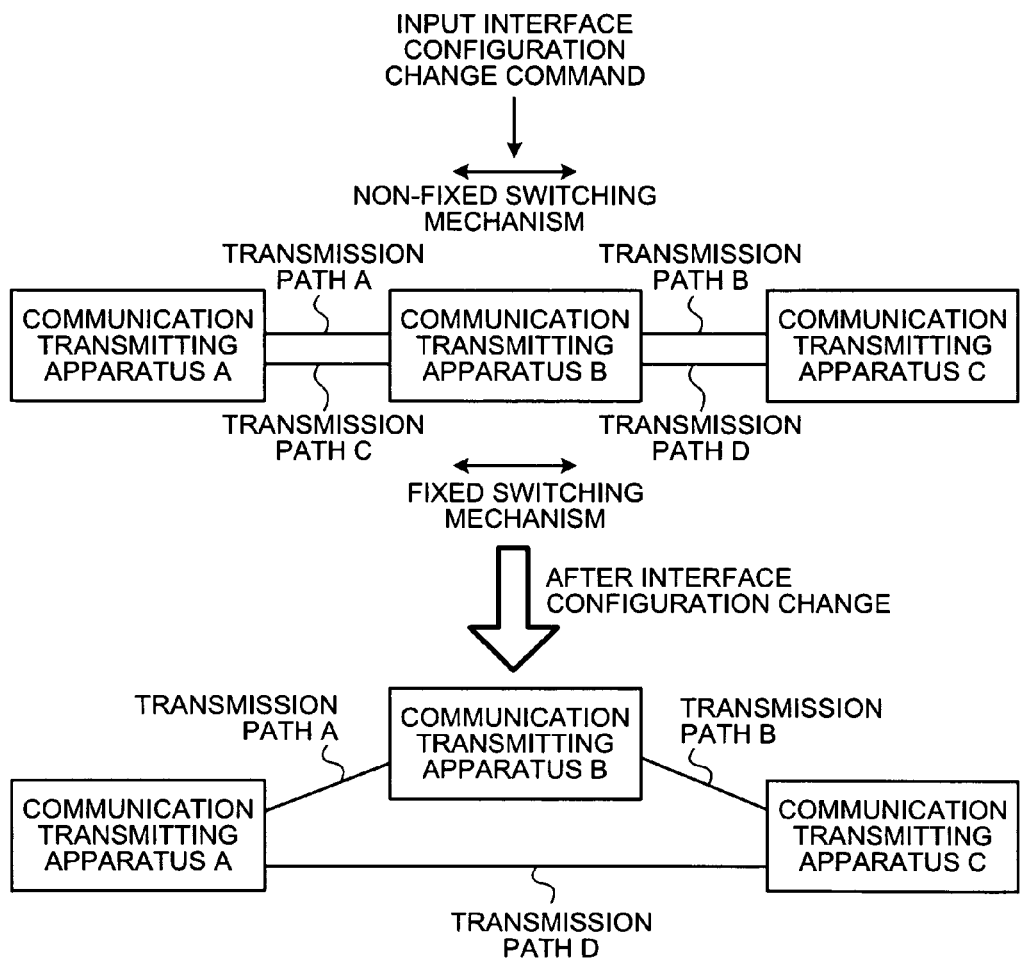
FIG. 16 depicts an outline of causing a plurality of adjacent communication transmitting apparatuses of the third embodiment to be passed through to change the interface configuration.
FIG. 17 depicts an example of a switching information table according to the third embodiment.

Description will first be made of an outline of causing a plurality of adjacent communication transmitting apparatuses of the third embodiment to be passed through to change the interface configuration. FIG. 16 depicts an outline of causing a plurality of adjacent communication transmitting apparatuses of the third embodiment to be passed through to change the interface configuration. As shown in FIG. 16, opposed communication transmitting apparatuses A and C are connected through transmission paths A and B and transmission paths C and D in a physical configuration going through a communication transmitting apparatus B. The communication transmitting apparatus B does not perform the fixed switching through the transmission paths A and B and performs the fixed switching only through the transmission paths C and D.

If the interface configuration changing command is input to the communication transmitting apparatus B in such a case, the interface configuration is changed only for the transmission paths of the fixed switching, and the opposed communication transmitting apparatuses A and C pass through the communication transmitting apparatus B on a transmission path D to achieve virtual connection such that the respective interfaces are directly connected while the transmission paths A and B remain in the configuration of relaying through the communication transmitting apparatus B as shown.

That is, if the communication transmitting apparatus B performs the fixed switching between certain interfaces and does not perform the fixed switching between other interfaces, the interfaces without the fixed switching may not excluded from the GMLPS operation by deleting the control channel information. In the third embodiment, control is performed to continuously utilize the control channel for the interfaces without the fixed switching.

From FIG. 3C, it can be seen that the switching is performed every 24 CH for channels of resources from 1 CH to 24 CH of the communication interface unit A 105 of "IF101", that the switching is performed every 24 CH for channels of resources from 25 CH to 48 CH of the communication interface unit A 105 of "IF101", that the interface unit C 107 of "IF103" has channels of resources from 1 CH to 48 CH and performs the switching every 48 CH, and that the communication interface unit D 108 of "IF104" has channels from 1 CH to 48 CH and performs the switching every 48 CH.

It can also be seen that the channels of resources from 1 CH to 24 CH of "IF101" are cross-connected to the channels of resources from 25 CH to 48 CH of "IF102", that the channels of resources from 25 CH to 48 CH of "IF101" are cross-connected to the channels of resources from 1 CH to 24 CH of "IF102", that all the channels of "IF103" are straight-connected to the channels of "IF104" having the same numbers, and that the "fixed switch mechanism" is implemented only between "IF103" and "IF104".

From FIG. 18, referring to the configuration change target interface list table 103b according to the third embodiment, it can be seen that the communication transmitting apparatus 100C may logically be passed through and may be excluded from the operation of GMPLS only partially by directly linking the interfaces with the "interface ID" of "IF103" and "IF104" (i.e., the communication interface unit C 107 and the communication interface unit D 108). The interfaces with the "interface ID" of "IF101" and "IF102" (i.e., the communication interface unit A 105 and the communication interface unit B 106) cannot directly be linked.

Therefore, when a plurality of combinations of interfaces performing the switching exists in the same communication transmitting apparatus, if a combination of interfaces performing the fixed switching is mixed with a combination of interfaces not performing the fixed switching, the configuration change target interface list table 103b must be provided with a "control channel continuation request flag" to perform control such that the entry of the control channel is not deleted since the combination of interfaces not performing the fixed switching exists along with the combination of interfaces performing the fixed switching.

Specifically, when the interface configuration change processing unit 101b refers to the switching information table 102c according to the third embodiment to extract and enter a combination of interfaces performing the fixed switching into the configuration change target interface list table 103b according to the third embodiment from the mixture of a combination of interfaces performing the fixed switching and a combination of interfaces not performing the fixed switching, the "control channel continuation request flag" of this entry is turned to "1 (on)".

A format of the interface configuration change request message according to the third embodiment includes fields of "destination IP address", "source IP address", "source apparatus ID", "changed IP address", "changed apparatus ID", "control channel continuation request flag", "change target communication transmitting apparatus ID", "change target communication transmitting apparatus interface ID", "changed communication transmitting apparatus ID", and "changed communication transmitting apparatus interface ID" as shown in an example of FIG. 19.

If three communication transmitting apparatuses are connected through N (N≧3) optical fibers for each apparatus and two opposed communication apparatuses have N transmission paths, it is assumed that the communication transmitting apparatus 100C extracts M (M<N, N≧2) combinations of fixed-switching interfaces. In this case, the "change target communication transmitting apparatus ID", the "change target communication transmitting apparatus interface ID", the "changed communication transmitting apparatus ID", and the "changed communication transmitting apparatus interface ID" of the interface configuration change request message according to the third embodiment have M-times repeated configurations.

The interface configuration change request message process according to the third embodiment will then be described. The processes other than the interface configuration change request message process are the same as the second embodiment and will not be described. The interface configuration change request message of the third embodiment is also executed at step S105 of FIG. 6A. FIG. 20 is a flowchart of the interface configuration change request message process procedure of the third embodiment.

The interface configuration change processing unit 101b first refers to the configuration change target interface list table 103b according to the third embodiment to check entries having the same opposed apparatus (step S131).

The interface configuration change processing unit 101b refers to the configuration change target interface list table 103b according to the third embodiment to store the "destination IP address", the "source IP address", the "source apparatus ID", the "changed IP address", and the "changed apparatus ID" into respective fields of the interface configuration change request message (step S132).

The interface configuration change processing unit 101b then refers to the configuration change target interface list table 103b according to the third embodiment to store the "change target communication transmitting apparatus ID", the "change target communication transmitting apparatus interface ID", the "changed communication transmitting apparatus ID", and the "changed communication transmitting apparatus interface ID" into respective fields of the interface configuration change request message (step S133).

The interface configuration change processing unit 101b then refers to the configuration change target interface list table 103b according to the third embodiment to determine whether an entry for the same opposed apparatus exists (step S134). If it is determined that an entry exists for the same opposed apparatus (step S134, Yes), the procedure goes to step S133, and if it is determined that no entry exists for the same opposed apparatus (step S134, No), the procedure goes to step S135.

At step S135, the interface configuration change processing unit 101b then refers to the configuration change target interface list table 103b according to the third embodiment and stores "1 (on)" into the "control channel continuation request flag" field of the interface configuration change request message according to the third embodiment if the "control channel continuation request flag" is "1 (on)".

The interface configuration change processing unit 101b then transmits the interface configuration change request message generated in the above process to a destination counterpart communication transmitting apparatus (step S136). After this process is completed, the procedure returns to step S106 of FIG. 6A.

The control channel information update process according to the third embodiment executed at step S106 of FIG. 6A will then be described. FIG. 21 is a flowchart of the control channel information update process procedure of the third embodiment. The interface configuration change processing unit 101b first determines whether the "control channel continuation request flag" of the received interface configuration change request message is "1 (on)" (step S151). If it is determined that the "control channel continuation request flag" is "1 (on)" (step S151, Yes), the control channel information update process according to the third embodiment is terminated, and the procedure returns to step S107 of FIG. 6A. If it is determined that the "control channel continuation request flag" is not "1 (on)" (step S151, No), the procedure goes to step S152.

At step S152, the interface configuration change processing unit 101b deletes from the control channel information table 103a an entry of control channel information corresponding to the interface information to be subjected to the configuration change process.

The interface configuration change processing unit 101b then changes the "control channel usage information" to "not use" for an entry of the IP link information corresponding to the interface information to be subjected to the configuration change process (steps S153). After this process is completed, the procedure returns to step S107 of FIG. 6A.

Figure 22:
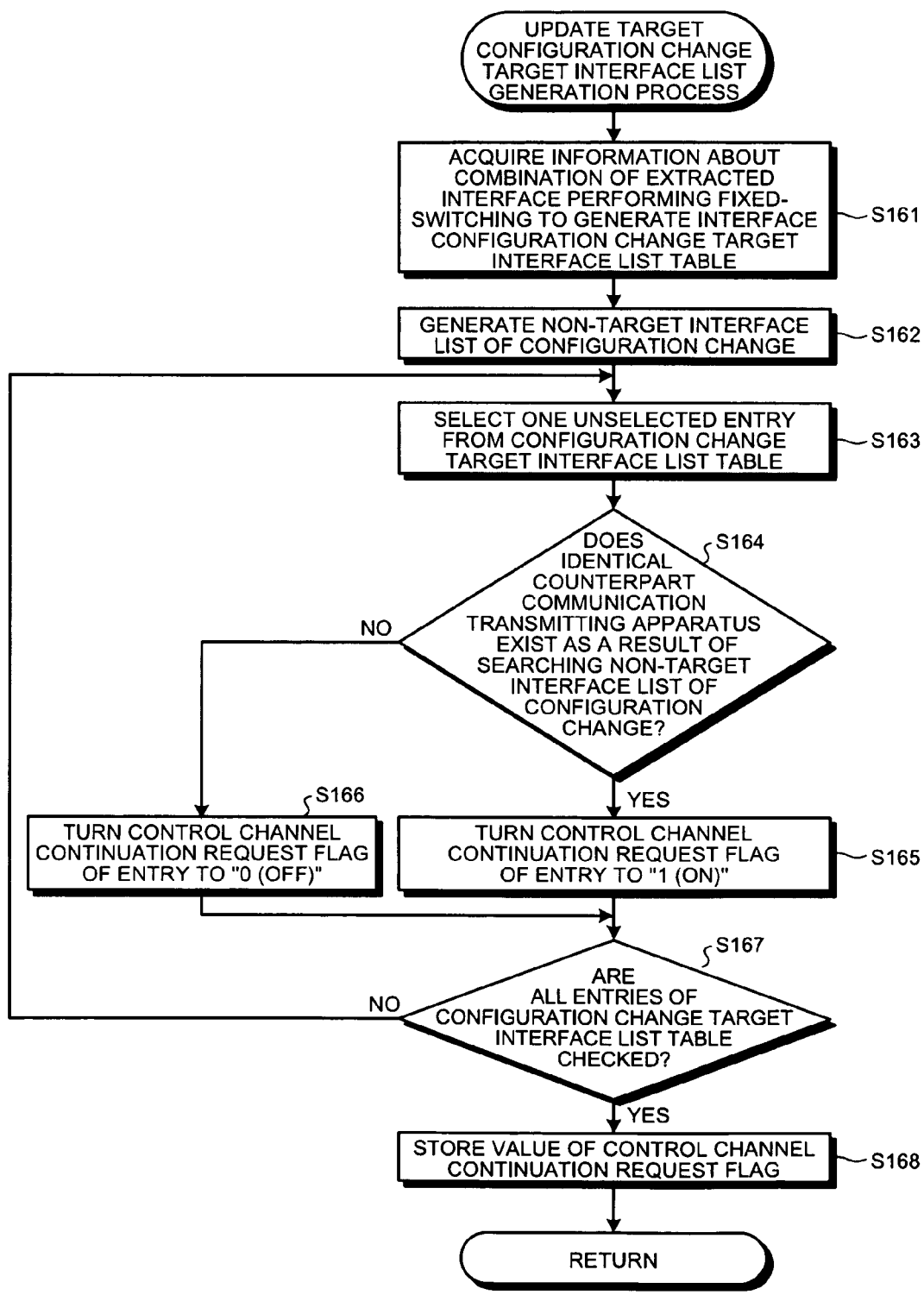
FIG. 22 is a flowchart of the configuration change target interface list generation process procedure of the third embodiment.

Details of the update target interface list generation process of step S103 of FIG. 6A will then be described. FIG. 22 is a flowchart of the update target interface list generation process procedure of the third embodiment. As shown in FIG. 22, the interface configuration change processing unit 101b acquires and enters the information about a combination of extracted interfaces performing fixed-switching (such as the counterpart communication transmitting apparatus IP address, the counterpart communication transmitting apparatus ID, the counterpart communication transmitting apparatus interface ID, and the own apparatus interface ID) into the configuration change target interface list table 103b (step S161).

The interface configuration change processing unit 101b extracts combinations of interfaces not performing the fixed switching to generate and store the non-target interface list of the configuration change into a storage area of a predetermined temporary storage device (step S162). The interface configuration change processing unit 101b selects one unselected entry from the configuration change target interface list table 103b extracted at step S161 (step S163).

The interface configuration change processing unit 101b determines whether the non-target interface list of the configuration change includes a counterpart communication transmitting apparatus identical to the entry selected at step S163 as a result of searching the non-target interface list of the configuration change (step S164). If it is determined that the non-target interface list of the configuration change includes a counterpart communication transmitting apparatus identical to the entry selected at step S163 (step S164, Yes), the procedure goes to step S165, and If it is determined that the non-target interface list of the configuration change does not include a counterpart communication transmitting apparatus identical to the entry selected at step S163 (step S164, No), the procedure goes to step S166.

At step S165, the interface configuration change processing unit 101b turns the control channel continuation request flag of the entry selected at step S164 to "1 (on)". After this process is completed, the procedure goes to step S167.

On the other hand, at step S166, the interface configuration change processing unit 101b turns the control channel continuation request flag of the entry selected at step S164 to "0 (off)". After this process is completed, the procedure goes to step S167.

At step S167, the interface configuration change processing unit 101b determines whether all the entries of the configuration change target interface list table 103b are checked. If it is determined that all the entries are checked (step S167, Yes), the procedure goes to step S168, and if it is determined that not all the entries are checked (step S167, No), the procedure goes to step S163.

At step S168, the interface configuration change processing unit 101b stores a value of the control channel continuation request flag set at step S165 or S166 into a column of the "control channel continuation request flag" of the entry on the configuration change target interface list table 103b. After this process is completed, the procedure returns to step S104 of FIG. 6A.

Figure 23:
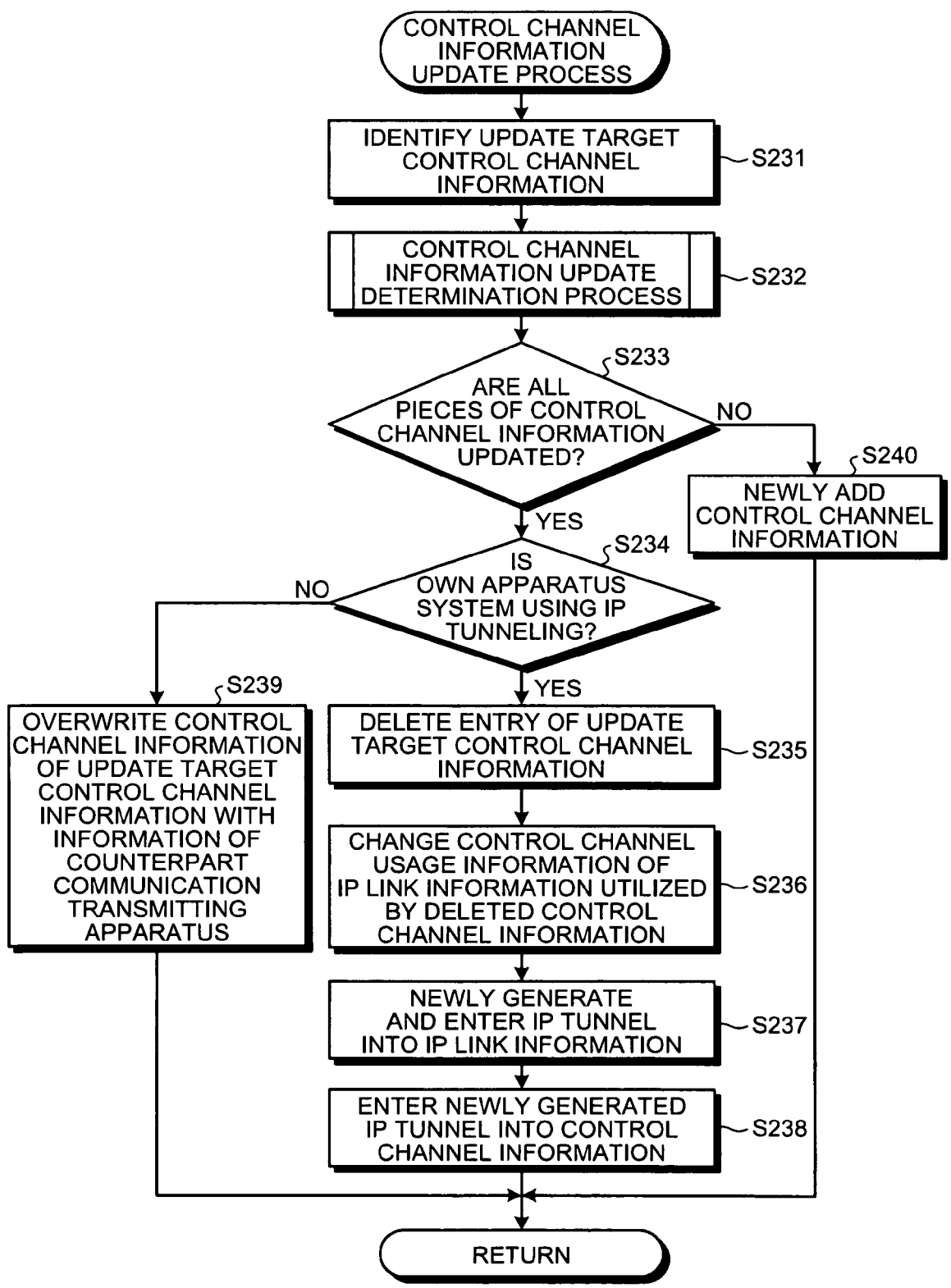
FIG. 23 is a flowchart of the control channel information update process (at the time of reception of the interface configuration change request message) procedure of the third embodiment.

The control channel information update process (at the time of reception of the interface configuration change request message) executed at step S202 of FIG. 7A will then be described. FIG. 23 is a flowchart of the control channel information update process (at the time of reception of the interface configuration change request message) procedure of the third embodiment. The interface configuration change processing unit 101b first identifies the control channel information to be updated based on the received interface configuration change request message (step S231).

The interface configuration change processing unit 101b executes a control channel information update determination process (step S232). Details of the control channel information update determination process will be described later with reference to FIG. 24. The interface configuration change processing unit 101b determines whether all the pieces of the control channel information are updated based on the result of the process at step S232 (step S233). If it is determined that all the pieces of the control channel information are updated (step S233, Yes), the procedure goes to step S234, and if it is determined that not all the pieces of the control channel information are updated (step S233, No), the procedure goes to step S240.

At step S234, the interface configuration change processing unit 101b determines whether the own apparatus is a system using the IP tunneling. If it is determined that the own apparatus is a system using the IP tunneling (step S234, Yes), the procedure goes to step S235, and if it is determined that the own apparatus is not a system using the IP tunneling (step S234, No), the procedure goes to step S239.

At step S235, the interface configuration change processing unit 101b deletes the entry of the control channel information to be updated from the control channel information table 103a. The interface configuration change processing unit 101b then changes the control channel usage information to "not use" for the IP link information utilized by the control channel information deleted at step S235 (steps S236).

The interface configuration change processing unit 101b newly generates and enters an IP tunnel into the IP link information of the IP link information table 102a (step S237). Specifically, an IP tunnel with a remote end "IP3", a local end "IP1", and a tunnel internal IP address "IP3" is newly generated with the use of GRE (General Routing Encapsulation) thought the IP link with the "identifier" of "1" having the control channel usage information changed to "not use" at step S236.

An IP address having the "identifier" of "2" in the IP link is used for the output destination of a packet addressed to "IP3". An IP address having the "identifier" of "2" in the control channel information is registered through the entry having the "identifier" of "2" in the IP link. The "counterpart communication transmitting apparatus IP address" and the "counterpart communication transmitting apparatus ID" are used as values included in the interface configuration change request message.

The interface configuration change processing unit 101b enters the IP tunnel newly generated at step S237 into the control channel information of the control channel information table 103a (step S238). Specifically, the IP tunnel is entered for the "identifier" of "2". After this process is completed, the procedure returns to step S203 of FIG. 7A.

On the other hand, at step S239, the interface configuration change processing unit 101b overwrites the update target control channel information with the information (IP address and apparatus ID) of the counterpart communication transmitting apparatus. After this process is completed, the procedure returns to step S203 of FIG. 7A. At step S240, the interface configuration change processing unit 101b newly adds the control channel information to the control channel information table 103a.

Figure 24:
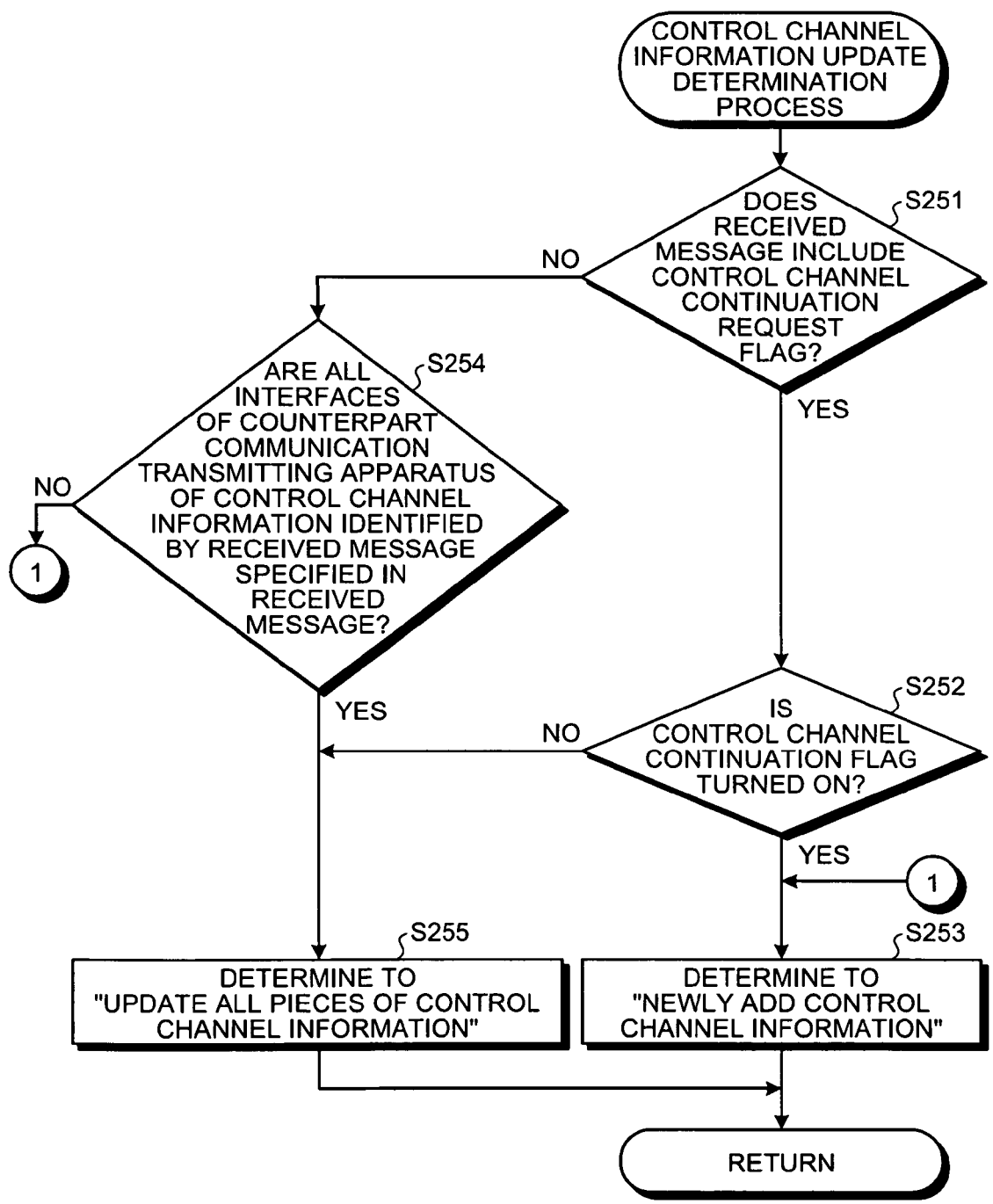
FIG. 24 is a flowchart of the control channel information update determination process procedure of the third embodiment.

The control channel information update determination process executed at step S232 of FIG. 23 will then be described. FIG. 24 is a flowchart of the control channel information update determination process procedure. The interface configuration change processing unit 101b first determines whether the received interface configuration change request message includes the "control channel continuation request flag" (step S251). If it is determined that the "control channel continuation request flag" is included (step S251, Yes), the procedure goes to step S252, and if it is determined that the the "control channel continuation request flag" is not included (step S251, No), the procedure goes to step S254.

At step S252, the interface configuration change processing unit 101b determines whether the "control channel continuation request flag" is "1 (on)". If it is determined that the "control channel continuation request flag" is "1 (on)" (step S252, Yes), the procedure goes to step S253, and if it is determined that the "control channel continuation request flag" is not "1 (on)" (step S252, No), the procedure goes to step S255. At step S253, the interface configuration change processing unit 101b determines to "newly add control channel information". After this process is completed, the procedure returns to step S233 of FIG. 23.

At step S254, the interface configuration change processing unit 101b determines whether all the interfaces of the counterpart communication transmitting apparatus of the control channel information identified by the received interface configuration change request message are specified in the interface configuration change request message (step S254).

If it is determined that all the interfaces of the counterpart communication transmitting apparatus of the control channel information identified by the received interface configuration change request message are specified in the interface configuration change request message (step S254, Yes), the procedure goes to step S255, and if it is determined that not all the interfaces of the counterpart communication transmitting apparatus of the control channel information identified by the received interface configuration change request message are specified in the interface configuration change request message (step S254, No), the procedure goes to step S253.

At step S255, the interface configuration change processing unit 101b determines to "update all the pieces of the control channel information". After this process is completed, the procedure returns to step S233 of FIG. 23.

Figure 25A:
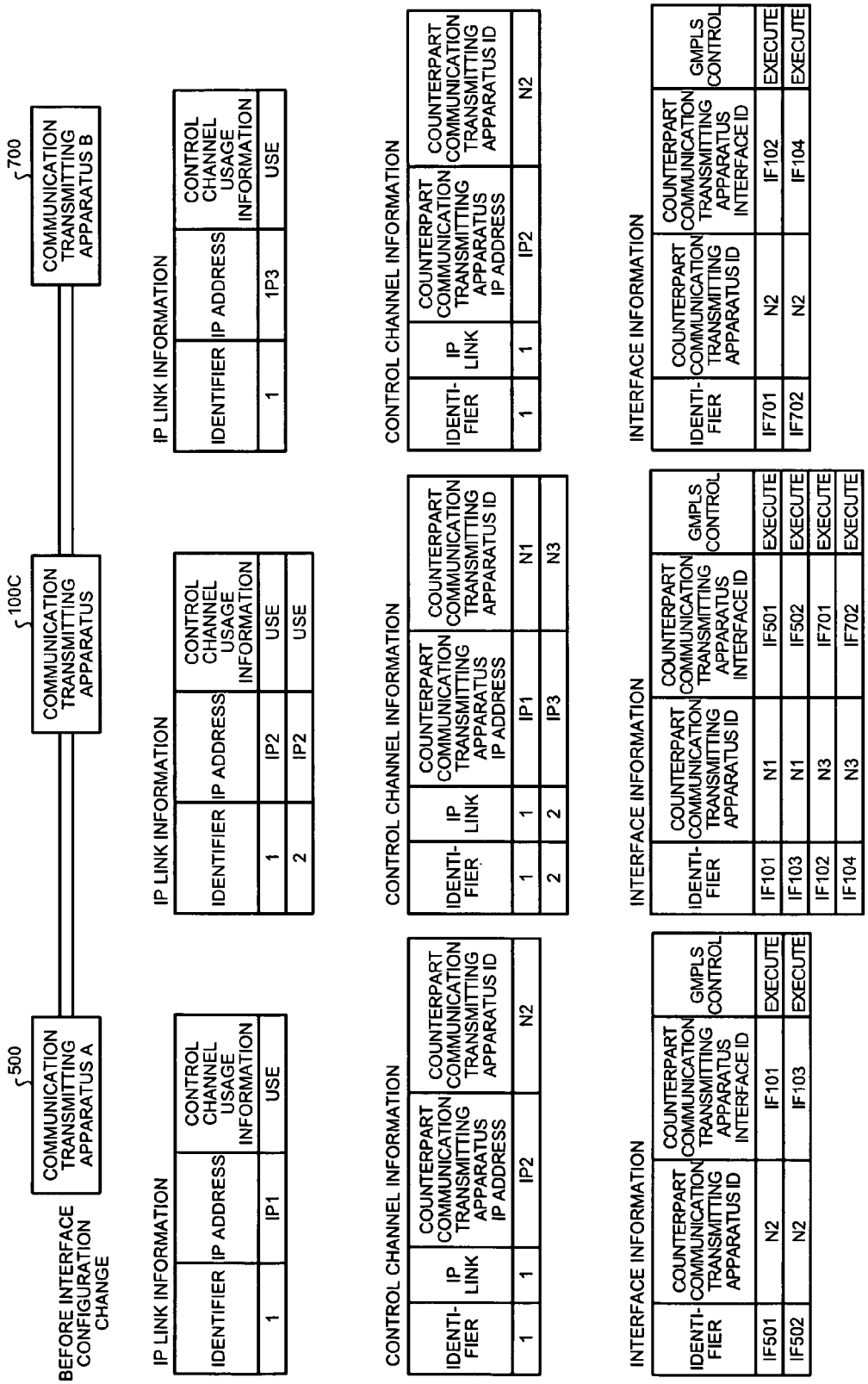
FIG. 25A depicts stored values of various tables before the interface configuration change of the third embodiment.

Changes in the IP link information, the control channel information, and the interface information due to the interface configuration change of the third embodiment will then be described with reference to FIGS. 25A, 25B, and 25C. FIG. 25A depicts the IP link information, the control channel information, and the interface information of the communication transmitting apparatus A 500, the communication transmitting apparatus 100C, and the communication transmitting apparatus B 700 before the interface configuration change of the third embodiment.

In FIG. 25A, the IP link information, the control channel information, and the interface information before the interface configuration change of the third embodiment are the same as those of the second embodiment shown in FIG. 15A. However, as shown in FIG. 18, the fixed-switching interfaces are only a combination of the interfaces of "IF103" and "IF104".

FIG. 25B depicts the IP link information, the control channel information, and the interface information of the communication transmitting apparatus A 500, the communication transmitting apparatus 100C, and the communication transmitting apparatus B 700 after the interface configuration change of the third embodiment (in the case of a system not using the IP tunnel). The IP link information of the communication transmitting apparatus A 500 is not changed before and after the interface configuration change.

However, the control channel information of the communication transmitting apparatus A 500 includes a newly added entry having the "identifier" of "2", the "IP link" of "1", the "counterpart communication transmitting apparatus IP address" of "IP3", and the "counterpart communication transmitting apparatus ID" of "N3" in addition to the entry having the "identifier" of "1". This addition is a result of the process at step S240 of FIG. 23. The reason why the control channel information must have two entries as above is that the communication transmitting apparatus A 500 is connected through two types of transmission paths, i.e., a transmission path capable of directly linking interfaces with the communication transmitting apparatus B 700 and a transmission path incapable of directly linking interfaces with the communication transmitting apparatus B 700.

Although the interface information of the communication transmitting apparatus A 500 is not changed in the entry having the "identifier" of "IF501", the "counterpart communication transmitting apparatus ID" is changed to "N3" and the "counterpart communication transmitting apparatus interface ID" is changed to "IF702" in the entry having the "identifier" of "IF502". This change is a result of the process at step S203 of FIG. 7A.

The IP link information and the control channel information of the communication transmitting apparatus 100C are not changed. In the interface information of the communication transmitting apparatus 100C, the "GMPLS control" is changed to "not execute" in the entries having the "identifiers" of "IF103" and "IF104". This change is a result of the process at step S153 of FIG. 21.

The IP link information of the communication transmitting apparatus B 700 is not changed before and after the interface configuration change. However, the control channel information of the communication transmitting apparatus B 700 includes a newly added entry having the "identifier" of "2", the "IP link" of "1", the "counterpart communication transmitting apparatus IP address" of "IP1", and the "counterpart communication transmitting apparatus ID" of "N1" in addition to the entry having the "identifier" of "1". This addition is a result of the process at step S240 of FIG. 23. The reason why the control channel information must have two entries as above is that the communication transmitting apparatus B 700 is connected through two types of transmission paths, i.e., a transmission path capable of directly linking interfaces with the communication transmitting apparatus A 500 and a transmission path incapable of directly linking interfaces with the communication transmitting apparatus A 500.

Although the interface information of the communication transmitting apparatus B 700 is not changed in the entry having the "identifier" of "IF701", the "counterpart communication transmitting apparatus ID" is changed to "N1" and the "counterpart communication transmitting apparatus interface ID" is changed to "IF502" in the entry having the "identifier" of "IF702". This change is a result of the process at step S203 of FIG. 7A.

FIG. 25C depicts the IP link information, the control channel information, and the interface information of the communication transmitting apparatus A 500, the communication transmitting apparatus 100C, and the communication transmitting apparatus B 700 after the interface configuration change of the third embodiment (in the case of a system using the IP tunnel). In the IP link information of the communication transmitting apparatus A 500, the control channel information is changed to "not use" in the entry having the "identifier" of "1". This change is a result of the process at step S236 of FIG. 23. An entry is newly added that has the "identifier" of "2", the "IP address" of "IP1 (tunnel: IP3, link 1)", and the "control channel usage information" of "use". This change is a result of the process at step S237 of FIG. 23.

The control channel information of the communication transmitting apparatus A 500 includes a newly added entry having the "identifier" of "2", the "IP link" of "2", the "counterpart communication transmitting apparatus IP address" of "IP3", and the "counterpart communication transmitting apparatus ID" of "N3" in addition to the entry having the "identifier" of "1". This change is a result of the process at step S238 of FIG. 23.

Although the interface information of the communication transmitting apparatus A 500 is not changed in the entry having the "identifier" of "IF501", the "counterpart communication transmitting apparatus ID" is changed to "N3" and the "counterpart communication transmitting apparatus interface ID" is changed to "IF702" in the entry having the "identifier" of "IF502". This change is a result of the process at step S203 of FIG. 7A.

After the interface configuration change of the third embodiment (in the case of a system using the IP tunnel), the IP link information, the control information, and the interface information of the communication transmitting apparatus 100C are the same as those after the interface configuration change of the third embodiment (in the case of a system not using the IP tunnel).

The IP link information of the communication transmitting apparatus B 700 includes a newly added entry having the "identifier" of "2", the "IP address" of "IP3 (tunnel: IP1, link 1)", and the "control channel usage information" of "use" in addition to the entry having the "identifier" of "1". This change is a result of the process at step S237 of FIG. 7A.

The control channel information of the communication transmitting apparatus B 700 includes a newly added entry having the "identifier" of "2", the "IP link" of "2", the "counterpart communication transmitting apparatus IP address" of "IP1", and the "counterpart communication transmitting apparatus ID" of "N1" in addition to the entry having the "identifier" of "1". This change is a result of the process at step S238 of FIG. 23.

In the interface information of the communication transmitting apparatus B 700, the entry having the "identifier" of "IF701" has the "counterpart communication transmitting apparatus ID" and the "counterpart communication transmitting apparatus interface ID" changed to "N1" and "IF501", respectively. This change is a result of the process at step S203 of FIG. 7A.

Fourth Embodiment

Figure 26:
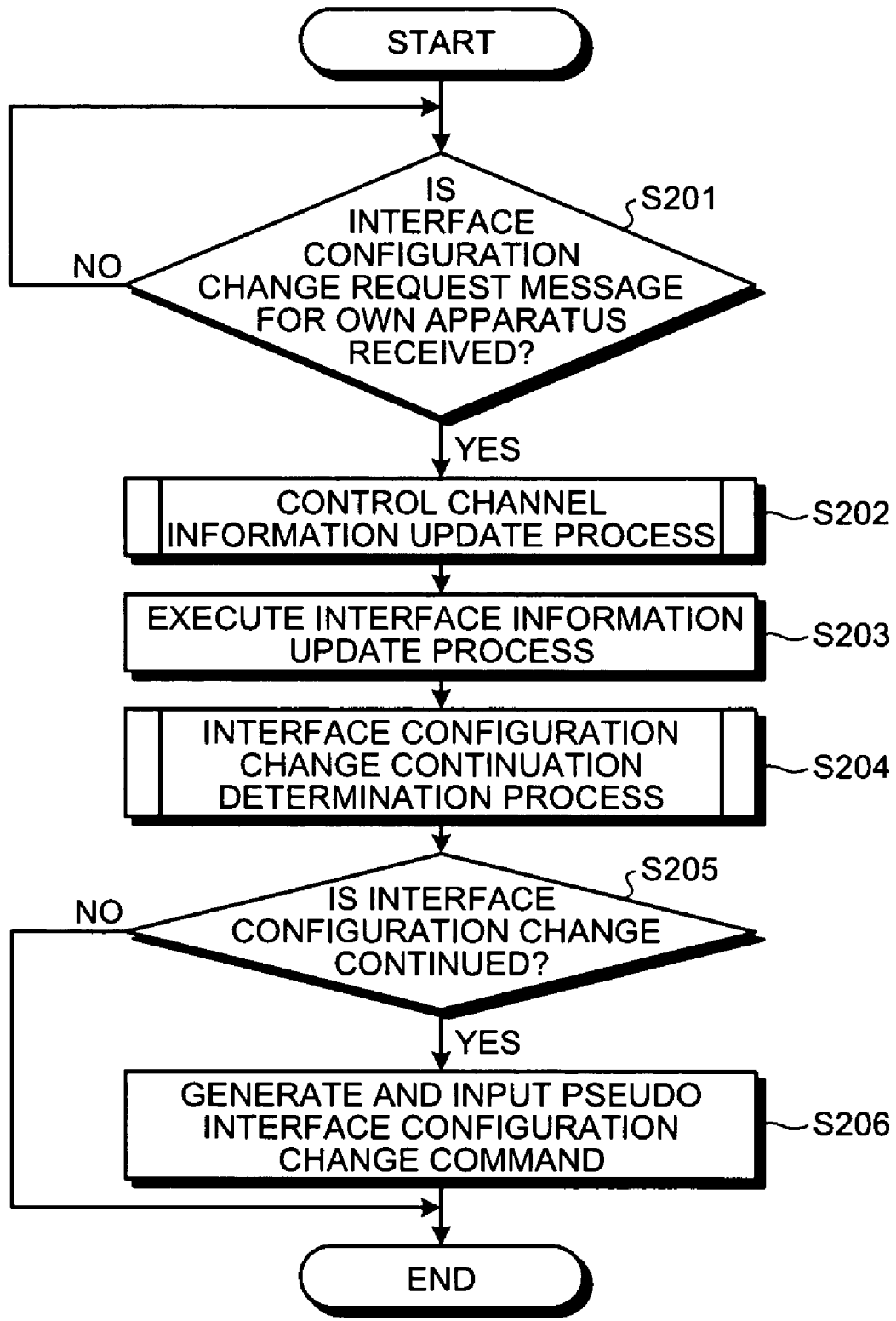
FIG. 26 is a flowchart of the interface configuration change request message receiving process procedure of the fourth embodiment.
Figure 27:
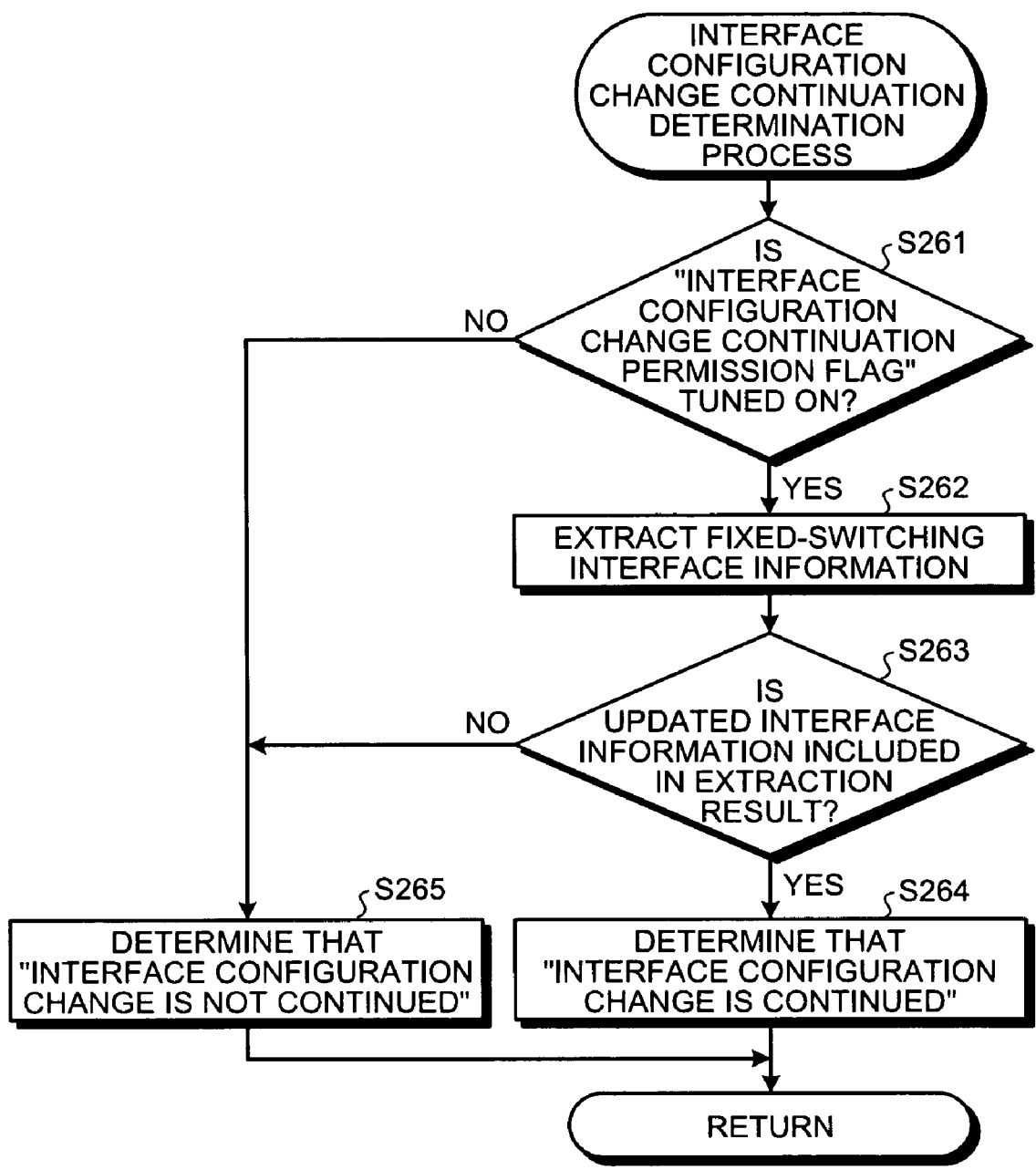
FIG. 27 is a flowchart of the interface configuration change continuation determination process procedure of the fourth embodiment.

A fourth embodiment will hereinafter be described with reference to FIGS. 26 to 28. It is assumed in the fourth embodiment that three communication transmitting apparatuses are connected through one optical fiber for each apparatus and that a communication transmitting apparatus 100D relays optical signals between two opposed communication transmitting apparatuses. The communication transmitting apparatus 100D according to the fourth embodiment has the same configuration as the configuration of the communication transmitting apparatus 100A according to the first embodiment. A process executed by the communication transmitting apparatus 100D will be described only for differences from the communication transmitting apparatus 100A.

The varied definition information storage unit 104 of the communication transmitting apparatus 100D according to the fourth embodiment has an "interface configuration change permission flag" stored thereon. A user may set or change this "interface configuration change permission flag" from the terminal apparatus 300. If the "interface configuration change permission flag" is "1 (on)", the communication transmitting apparatus 100D changes the interface configuration in response to reception of the interface configuration change request message from another communication transmitting apparatus and then autonomously extracts a combination of fixed-switching interfaces in the own apparatus to change the interface configuration.

An interface configuration change request message receiving process executed by the communication transmitting apparatus 100D according to the fourth embodiment will first be described. FIG. 26 is a flowchart of the interface configuration change request message receiving process procedure of the fourth embodiment. As shown FIG. 26, the interface configuration change processing unit 101b refers to the "destination IP address" of the received interface configuration change request message to determine whether the message is addressed to the own apparatus (step S201). If it is determined that the message is addressed to the own apparatus (step S201, Yes), the procedure goes to step S202, and if it is determined that the message is not addressed to the own apparatus (step S201, No), step S201 is repeated.

The interface configuration change processing unit 101b executes the control channel information update process (at the time of reception of the interface configuration change request message) based on the received interface configuration change request message (step S202). Details of this control channel information update process (at the time of reception of the interface configuration change request message) are same as those described in FIG. 7B.

The interface configuration change processing unit 101b executes the interface information update process of updating the interface information entered in the interface information table 102b based on the received interface configuration change request message (step S203).

The interface configuration change processing unit 101b then executes an interface configuration change continuation determination process (step S204). Details of the interface configuration change continuation determination process will be described later with reference to FIG. 27.

The interface configuration change processing unit 101b then determines whether the interface configuration change is continued based on the determination at step S204 (step S205). If it is determined that the interface configuration change is continued (step S205, Yes), the procedure goes to step S206, and if it is determined that the interface configuration change is not continued (step S205, No), the interface configuration change request message receiving process is terminated.

At step S206, the interface configuration change processing unit 101b generates and inputs a pseudo interface configuration change command to the input command processing unit 101a.

The interface configuration change continuation determination process executed by the communication transmitting apparatus 100D according to the fourth embodiment will then be described. FIG. 27 is a flowchart of the interface configuration change continuation determination process procedure of the fourth embodiment. As shown in FIG. 27, the interface configuration change processing unit 101b refers to the "interface configuration change continuation permission flag" stored in the varied definition information storage unit 104 to determine whether the value is "1 (on)" (step S261).

If it is determined that the value of the "interface configuration change continuation permission flag" is "1 (on)" (step S261, Yes), the procedure goes to step S262, and if it is determined that the value of the "interface configuration change continuation permission flag" is not "1 (on)" (step S261, No), the procedure goes to step S265.

At step S262, the interface configuration change processing unit 101b refers to the switching information table 102c to extract the fixed-switching interface information (interface combination information).

The interface configuration change processing unit 101b then determines whether the extraction result of step S262 includes the interface information updated in association with the reception of this interface configuration change request message (step S263).

If it is determined that the extraction result of step S262 includes the interface information updated in association with the reception of this interface configuration change request message (step S263, Yes), the procedure goes to step S264, and if it is determined that the extraction result of step S262 does not include the interface information updated in association with the reception of this interface configuration change request message (step S263, No), the procedure goes to step S265.

At step S264, the interface configuration change processing unit 101b determines that "the interface configuration change is continued". On the other hand, at step S265, the interface configuration change processing unit 101b determines that "the interface configuration change is not continued". After the process of step S264 or S265 is completed, the procedure returns to step S205 of FIG. 26.

Figure 28:
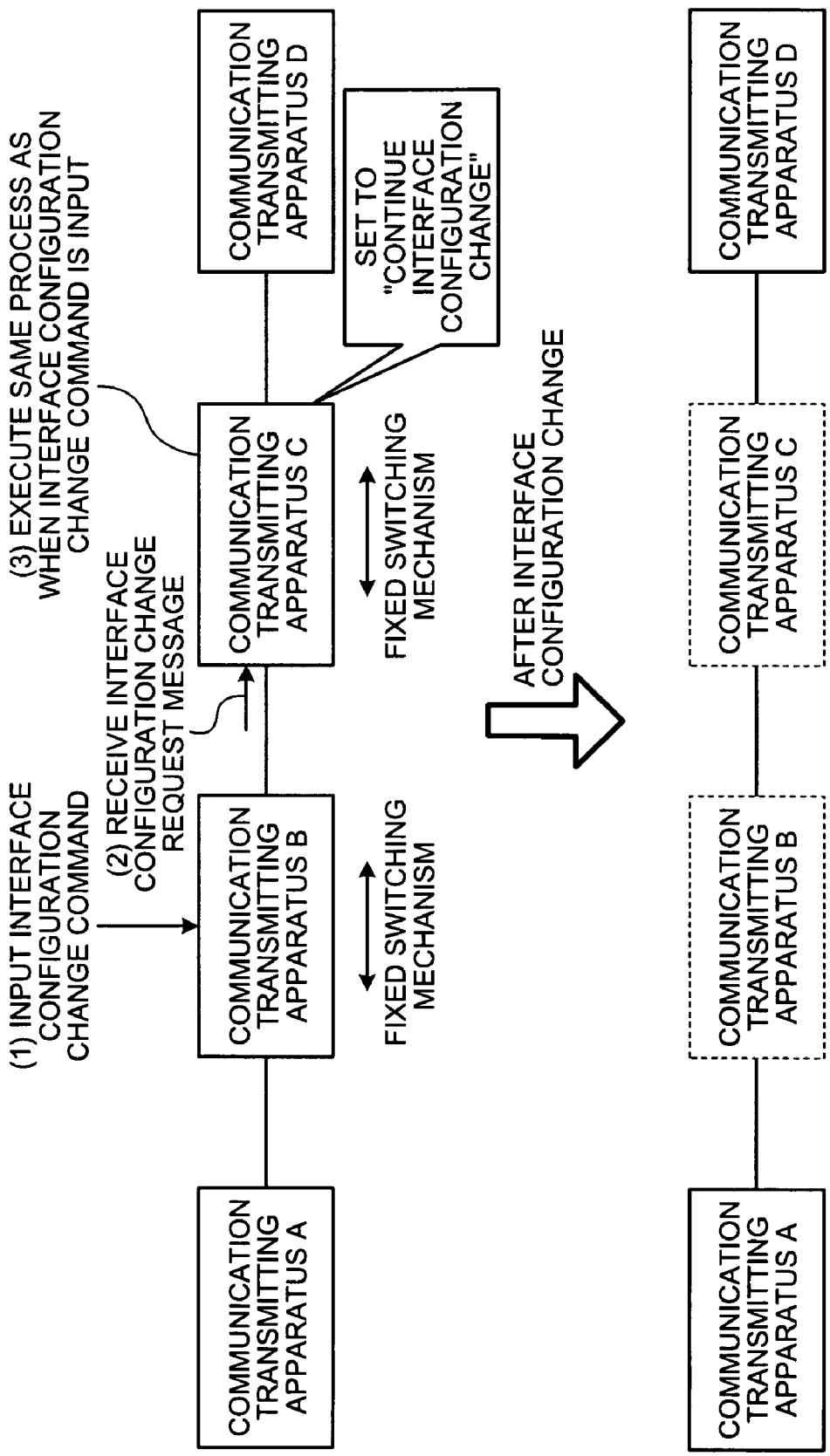
FIG. 28 depicts an outline of causing a plurality of adjacent communication transmitting apparatuses to be passed through to change the interface configuration in an application of the fourth embodiment.

If a plurality of the communication transmitting apparatuses 100D (the communication transmitting apparatus B and the communication transmitting apparatus C) of the fourth embodiment exists between the opposed communication transmitting apparatuses (the communication transmitting apparatus A and the communication transmitting apparatus D) as shown in FIG. 28 and the value of the "interface configuration change permission flag" set in the communication transmitting apparatus C is "1 (on)", since (1) when the interface configuration change command is input to the communication transmitting apparatus B, the interface configuration is changed; (2) the communication transmitting apparatus C receives the interface configuration change request message from the communication transmitting apparatus B and changes a configuration of an interface indicated by the interface configuration change request message; and (3) the communication transmitting apparatus C subsequently and autonomously changes the interface configuration, only inputting the interface configuration change command to one communication transmitting apparatus causes the adjacent communication transmitting apparatus with the "interface configuration change permission flag" having a value of "1 (on)" to sequentially change the interface configuration such that the own apparatus is passed through with regard to the connection between the communication transmitting apparatus A and the communication transmitting apparatus D.

Although the embodiments of the present invention have been described as above, the present invention is not limited to these embodiments and may be implemented in various different embodiments. The effects of the embodiments are not limited to the described effects.

Among the processes described in the embodiments, all or some of the processes described as those automatically executed may manually be executed, or all or some of the processes described as those manually executed may automatically be executed by a known method. A change may arbitrarily be made in other pieces of information including process procedures, control procedures, specific names, and various data and parameters if not otherwise specified.

The constituent elements of the apparatuses are functionally conceptual elements and may not necessarily be configured physically as shown. That is, specific distributed/integrated forms of the apparatuses are not limited to the forms shown, and the forms may functionally or physically be configured to entirely or partially be distributed/integrated depending on various loads and usage situations.

All or some of the process functions executed in the apparatuses may be implemented by CPU (Central Processing Unit) (or microcomputer such as MPU (Micro Processing Unit) and MCU (Micro Controller Unit)) or programs analyzed and executed by the CPU (or microcomputer such as MPU and MCU), or may be implemented as hardware through wired logic.

According to the present invention, if fixed switching is performed to relay the input communication transmitting apparatus and the output communication transmitting apparatus, since the network control information corresponding to the fixed switching and stored in the own apparatus is updated to exclude the own apparatus from the control of the autonomous distributed controlling unit, the burden of the autonomous distributed control may be reduced. Since the control information update message is generated and transmitted to the input communication transmitting apparatus and the output communication transmitting apparatus to update the respectively stored pieces of network control information in accordance with the network control information, consistency may automatically be achieved in the pieces of the network control information respectively stored in the own apparatus, the input communication transmitting apparatus, and the output communication transmitting apparatus.

According to the present invention, the network control information automatically stored in the own apparatus may be made consistent with the pieces of the network control information respectively stored in the communication transfer apparatus that is the control information update message transmission source and the output communication transmitting apparatus.

According to the present invention, whether the network control information is updated may be controlled through the command.

According to the present invention,

According to the present invention, even if the input communication transmitting apparatus and the output communication transmitting apparatus are connected to a plurality of transmission paths, whether the network control information is updated may be controlled for each transmission path depending on whether fixed transfer information exists.

According to the present invention, if the input communication transmitting apparatus and the output communication transmitting apparatus are relayed by sequentially inputting a command to a plurality of communication transmitting apparatuses located on a transmission path of the opposed input and output communication transmitting apparatuses to perform fixed switching in the communication transmitting apparatuses, since the network control information corresponding to the fixed switching and stored in the communication transmitting apparatuses is updated to exclude the own apparatuses from the control of the autonomous distributed controlling unit, the burden may be reduced by sequentially excluding from the autonomous distributed control the plurality of communication transmitting apparatuses located on the transmission path of the opposed input and output communication transmitting apparatuses.

According to the present invention, after the control information update message is received and the network control information of the own apparatus is updated in accordance with the contents of instruction of the control information update message, the update process of the network control information is autonomously executed depending on information of the control information update permission flag stored in the plurality of communication transmitting apparatuses located on the transmission path of the opposed input and output communication transmitting apparatuses, the network control information may be autonomously updated in the plurality of communication transmitting apparatuses located on the transmission path of the opposed input and output communication transmitting apparatuses by only inputting the command to one of the communication transmitting apparatus, and the communication transmitting apparatuses may sequentially be excluded from the autonomous distributed control to reduce the burden.

According to the present invention the own station may be excluded from the autonomous distributed control to reduce the burden by only setting the IP tunneling between the opposed input and output communication transmitting apparatuses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication transmitting apparatus comprising:
a control information storage unit that has stored thereon control information about a first apparatus and a second apparatus which are adjacent to the communication transmitting apparatus;
an autonomous distributed controlling unit that autonomously controls a first communication with the first apparatus and a second communication with the second apparatus based on the control information stored in the control information storage unit;
a transfer information storage unit that has stored thereon transfer information about resources of a first interface connected to the first apparatus and resources of a second interface connected to the second apparatus; and
an autonomous control updating unit that establishes a direct logical link between the first interface and the second interface by requesting the first apparatus to communicate with the second apparatus and requesting the second apparatus to communicate with the first apparatus, when the transfer information stored in the transfer information storage unit has a correlation that the resources of the first interface and the second interface are substantially the same, and excludes the first communication and the second communication from a control of the autonomous distributed controlling unit by updating the control information about the first apparatus and the second apparatus stored in the control information storage unit.

2. The communication transmitting apparatus according to claim 1, wherein the autonomous control updating unit receives a control information update message and updates the control information in accordance with contents of instruction of the control information update message.

3. The communication transmitting apparatus according to claim 1, further comprising a transfer information extracting unit that extracts transfer information having the correlation that the resources between the first interface and the second interface are same from the transfer information stored in the transfer information storage unit and a command input accepting unit that accepts input of a command from a user, wherein
if the command input accepting unit accepts input of the command, the transfer information extracting unit extracts the transfer information having the the correlation that the resources between the first interface and the second interface are the same from the transfer information stored in the transfer information storage unit.

4. The communication transmitting apparatus according to claim 1, wherein
the first apparatus and the second apparatus are connected through a plurality of transmission paths, wherein
the transfer information stored in the transfer information storage unit further includes transfer information about resources of a third interface connected to the first apparatus and resources of a fourth interface connected to the second apparatus, and wherein
the transfer information extracting unit further extracts transfer information having a correlation that the resources between the third interface and the fourth interface are the same from the transfer information stored in the transfer information storage unit.

5. The communication transmitting apparatus according to claim 4, wherein the control information has further stored thereon a control information update control flag causing control to be performed such that the autonomous control updating unit updates the control information about the first apparatus and the second apparatus corresponding to the transfer information only for the transmission paths connected to the interfaces included in the transfer information extracted by the transfer information extracting unit and excludes the first communication and the second communication from the control of the autonomous distributed controlling unit.

6. The communication transmitting apparatus according to claim 1, wherein a plurality of the communication transmitting apparatuses exists on the transmission path between the first apparatus and the second apparatus, and wherein
the communication transmitting apparatus exclude the a third communication between the plurality of the communication transmitting apparatuses from the control of the autonomous distributed controlling unit by sequentially performing the process of the transfer information extracting unit extracting the transfer information and the autonomous control updating unit updating the control information about the first apparatus and the second apparatus corresponding to the transfer information extracted by the transfer information extracting unit and excluding the first communication and the second communication from the control of the autonomous distributed controlling unit.

7. The communication transmitting apparatus according to claim 1, wherein a plurality of the communication transmitting apparatuses exists on the transmission path between the first apparatus and the second apparatus, and wherein
the communication transmitting apparatuses further include a control information update permission flag storage unit that has stored thereon a control information update permission flag for setting whether after the autonomous control updating unit receives the control information update message and updates the control information of the communication transmitting apparatus in accordance with contents of instruction of the control information update message, the communication transmitting apparatuses are caused to autonomously perform the process of the transfer information extracting unit extracting the transfer information and the autonomous control updating unit updating the control information about the first apparatus and the second apparatus corresponding to the transfer information extracted by the transfer information extracting unit and excluding the first communication and the second communication from the control of the autonomous distributed controlling unit.

8. The communication transmitting apparatus according to claim 1, wherein the autonomous control updating unit updates the control information with information using IP tunneling in the first apparatus and the second apparatus.

9. A communication transmitting method performed by a communication transmitting apparatus, the method comprising:
- first storing thereon control information about a first apparatus and a second apparatus which are adjacent to the communication transmitting apparatus;
- controlling autonomously a first communication with the first apparatus and a second communication with the second apparatus based on the control information stored at the first storing;
- second storing thereon transfer information about resources of a first interface connected to the first apparatus and resources of a second interface connected to the second apparatus;
- establishing a direct logical link between the first interface and the second interface by requesting the first apparatus to communicate with the second apparatus and requesting the second apparatus to communicate with the first apparatus, when the transfer information stored at the second storing has a correlation between the resources of the first interface and the second interface is substantially the same; and
- excluding the first communication and the second communication from the controlling by updating the control information about the first apparatus and the second apparatus stored at the second storing.

10. The communication transmitting method according to claim 9, further comprising receiving a control information update message and updating the control information in accordance with contents of instruction of the control information update message.

11. The communication transmitting method according to claim 9, further comprising extracting transfer information having the correlation that the resources between the first interface and the second interface are the same from the transfer information stored at the first storing and accepting input of a command from a user, wherein
the extracting includes extracting, if the input of the command is accepted, transfer information having the correlation that the resources between the first interface and the second interface are the same from the transfer information.

12. The communication transmitting method according to claim 9, wherein
the first apparatus and the second apparatus are connected through a plurality of transmission paths, wherein
the transfer information further includes transfer information about resources of a third interface connected to the first apparatus and resources of a fourth interface connected to the second apparatus, and wherein
the extracting further includes extracting transfer information having a correlation that the resources between the third interface and the fourth interface are the same from the transfer information.

13. The communication transmitting method according to claim 12, wherein the control information has further stored thereon a control information update control flag causing control to be performed such that the control information about the first apparatus and the second apparatus corresponding to the transfer information is updated only for the transmission paths connected to the interfaces included in the transfer information extracted by the extracting, and excluding the first communication and the second communication from the controlling.

14. The communication transmitting method according to claim 9, wherein
in a plurality of the communication transmitting apparatuses present on the transmission path between the first apparatus and the second apparatus,
the third communication between the plurality of communication transmitting apparatuses is excluded from the controlling by sequentially extracting the transfer information and updating the control information about the first apparatus and the second apparatus corresponding to the transfer information extracted by the extracting.

15. The communication transmitting method of claim 9, wherein
in a plurality of the communication transmitting apparatuses exists on the transmission path between the first apparatus and the second apparatus,
if a present control information update permission flag is turned on, after the control information update message is received to update the control information of the communication transmitting apparatus in accordance with contents of instruction of the control information update message at the generating and transmitting, the process is autonomously performed to extract the transfer information at the extracting, to update the control information about the first apparatus and the second apparatus corresponding to the transfer information extracted at the extracting, and to exclude the first communication and the second communication from the controlling.

16. The communication transmitting method according to claim 9, wherein the updating unit includes updating the control information with information using IP tunneling.

\* \* \* \* \*